US 8,407,171 B2

(12) United States Patent
Das Gupta et al.

(10) Patent No.: US 8,407,171 B2
(45) Date of Patent: Mar. 26, 2013

(54) METHOD FOR CONSTRAINT OPTIMIZATION UNDER BOX CONSTRAINTS

(75) Inventors: Mithun Das Gupta, Cupertino, CA (US); Jing Xiao, Cupertino, CA (US); Sanjeev Kumar, San Diego, CA (US)

(73) Assignee: Seiko Epson Corporation, Tokyo (JP)

( * ) Notice: Subject to any disclaimer, the term of this patent is extended or adjusted under 35 U.S.C. 154(b) by 427 days.

(21) Appl. No.: 12/853,886

(22) Filed: Aug. 10, 2010

(65) Prior Publication Data
US 2011/0191400 A1 Aug. 4, 2011

Related U.S. Application Data

(60) Provisional application No. 61/300,100, filed on Feb. 1, 2010.

(51) Int. Cl.
*G06F 17/00* (2006.01)
(52) U.S. Cl. .................................................. 706/45
(58) Field of Classification Search ............ 706/12, 706/45
See application file for complete search history.

(56) References Cited

U.S. PATENT DOCUMENTS

| | | | |
|---|---|---|---|
| 7,406,450 B2 | 7/2008 | Graf et al. | |
| 7,542,947 B2 | 6/2009 | Guyon et al. | |
| 2004/0221192 A1* | 11/2004 | Motta et al. | 714/8 |
| 2005/0131847 A1 | 6/2005 | Weston et al. | |
| 2007/0167784 A1* | 7/2007 | Shekhar et al. | 600/443 |
| 2008/0222062 A1* | 9/2008 | Liu et al. | 706/15 |
| 2008/0233576 A1 | 9/2008 | Weston et al. | |

OTHER PUBLICATIONS

Boyd, S., et al., "Convex Optimization", Cambridge University Press, pp. 229-287, 2004.
Duchi, J., et al., "Efficient Projections onto the L1-Ball for Learning in High Dimensions", In ICML '08, Proceedings of the 25th Intl. Conf. Machine Learning, 2008.
Bertsekas, D., "Projected Newton Methods for Optimization Problems with Simple Constraints", SIAM J. Control and Optimization, vol. 20, No. 2, Mar. 1982.
Candes, E. J., "Compressive sampling", Proceedings of the International Congress of Mathematicians, Madrid, Spain, 2006.
Crammer, K., et al., "On the Learnability and Design of Output Codes for Multiclass Problems", Proceedings of the 13th Annual Conference on Computational Learning Theory, pp. 35-46, 2004.
Donoho, D. L., "For Most Large Underdetermined Systems of Linear Equations the Minimal l1-norm Solution is also the Sparsest Solution", Comm. Pure Appl. Math, 59: 797-829, Sep. 16, 2004.
Gafni, E., et al., "Two-Metric Projection Methods for Constrained Optimization", In SIAM J. Control and Optimization, pp. 936-964, 1984.
Koh, K., et al., "An Interior-Point Method for Large-Scale l-1 Regularized Logistic Regression", Journal of Machine Learning Research 8 (2007) pp. 1519-1555, 2007.
Lin, C.-J., et al., Newtons Method for Large Bound-Constrained Optimization Problems, In SIAM Journal of Optimization, vol. 9, pp. 1100-1127, 1998.
Ng, A.Y., "Feature Selection, L1 vs. L2 regularization, and rotational invariance", Proceedings of the 21st International Conference on Machine Learning, Baniff, Canada, 2004.

(Continued)

*Primary Examiner* — David Vincent

(57) ABSTRACT

Similarities between simplex projection with upper bounds and $L_1$ projection are explored. Criteria for a-priori determination of sequence in which various constraints become active are derived, and this sequence is used to develop efficient algorithms for projecting a vector onto the $L_1$-ball while observing box constraints. Three projection methods are presented. The first projection method performs exact projection in $O(n^2)$ worst case complexity, where n is the space dimension. Using a novel criteria for ordering constraints, the second projection method has a worst case complexity of $O(n \log n)$. The third projection method is a worst case linear time algorithm having $O(n)$ complexity. The upper bounds defined for the projected entries guide the $L_1$-ball projection to more meaningful predictions.

27 Claims, 12 Drawing Sheets

OTHER PUBLICATIONS

Rosset, S., et al., "Piecewise Linear Regularized Solution Paths", The Annals of Statistics, vol. 35, No. 3, pp. 1012-1030, 2007.

Shalev-Shwartz, S., et al., "Efficient Learning of Label Ranking by Soft Projections onto Polyhedra", Journal of Machine Learning Research, vol. 7, pp. 1567-1599, 2006.

Tibshirani, R., "Regression shrinkage and selection via the lasso", Journal of the Royal Statistical Society, Series B (Methodological), vol. 58, Issue 1, pp. 267-288, 1996.

Donoho, D., "Compressed Sensing", IEEE Trans. Inform. Theory, 52: 1289-1306, 2006.

* cited by examiner

| $i \Rightarrow$ | 1 | 2 | 3 | 4 | 5 | 6 | 7 | 8 | 9 | ... | $n-2$ | $n-1$ | $n$ |
|---|---|---|---|---|---|---|---|---|---|---|---|---|---|
| $X \Rightarrow$ | U | C | L | U | U | C | L | C | C | ... | U | L | C |
| ↓ | ↓ | ↓ | ↓ | ↓ | ↓ | ↓ | ↓ | ↓ | | ↓ | ↓ | ↓ |
| $b_1$ | $(v_2-\theta)$ | 0 | $b_4$ | $b_5$ | $(v_6-\theta)$ | 0 | $(v_8-\theta)$ | $(v_9-\theta)$ | | $b_{n-2}$ | 0 | $(v_n-\theta)$ |

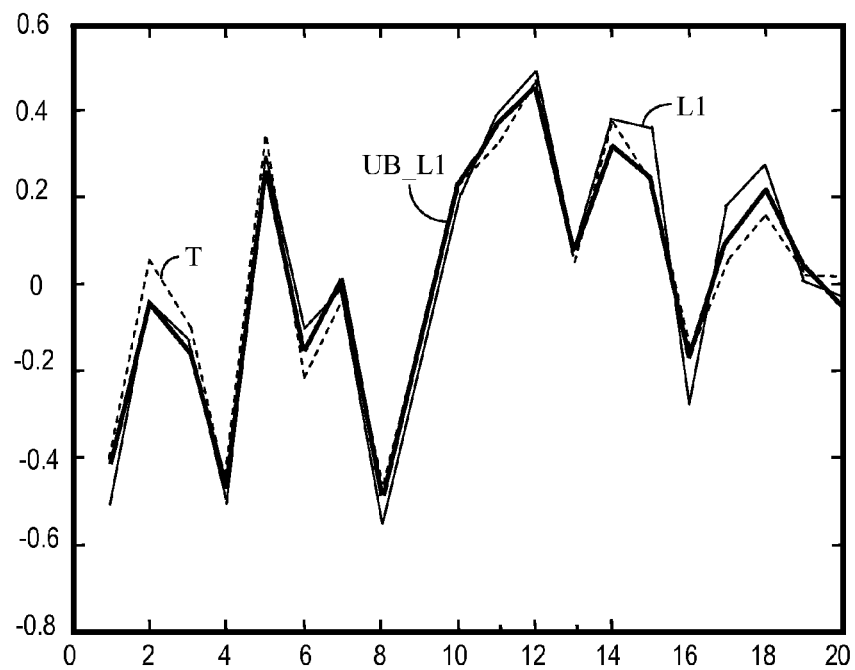
FIG. 10C
FIG. 11A
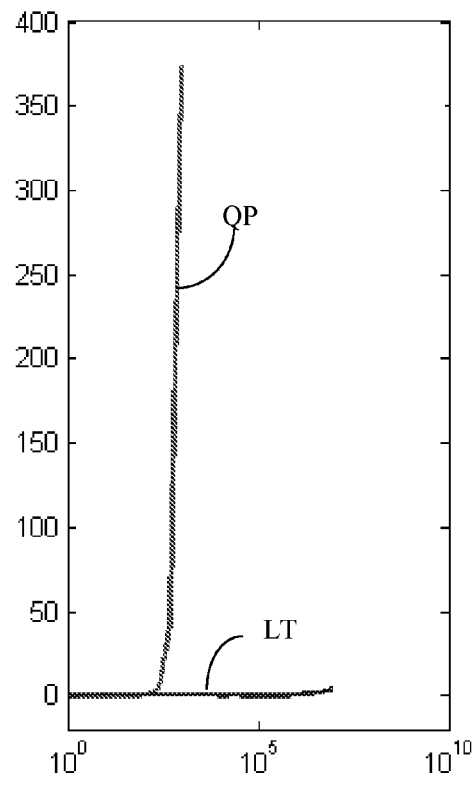
FIG. 11B
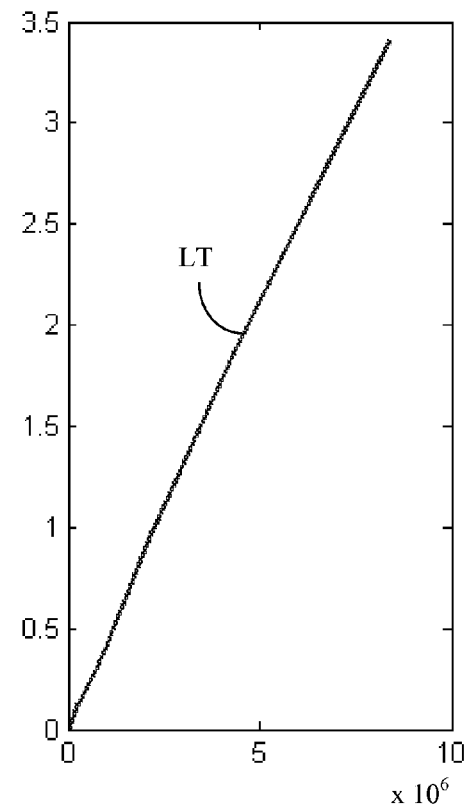

METHOD FOR CONSTRAINT OPTIMIZATION UNDER BOX CONSTRAINTS

CONTINUING APPLICATION DATA

This application claims the benefit of U.S. Provisional Application No. 61/300,100 filed Feb. 1, 2010 under 35 U.S.C. §119(e) and is hereby incorporated by reference in its entirety

BACKGROUND

1. Field of Invention

The present invention generally relates to the field of machine learning, and more particularly relates to bounded optimization.

2. Description of Related Art

In the world of machine learning and related fields, penalized convex optimization is one of the most important topics of research. The penalties, or regularizations, imposed on the unconstrained convex cost function have largely been represented as $L_2$-norm or $L_1$-norm over a predicted vector. An alternative, but mathematically equivalent, approach is to cast the problem as a constrained optimization problem. In this setting, a minimizer of the objective function is constrained to have a bounded norm. A similar line of research has proposed a projection based regularization, wherein the convex function to be optimized is minimized without any constraint, and then the resultant sub-optimal solution is constrained to lie within the constrain space.

As it is known in the art, the $L_2$-norm penalty imposes a smoothness constraint, and the $L_1$-norm imposes sparsity constraint. Lately, sparse representations have been shown to be extremely efficient in encoding specific types of data, mainly, those obeying power decay law in some transform space such as the DCT. In an article entitled "For Most Large Under Determined Systems of Linear Equations the Minimal $L_1$-norm Solution is Also the Sparsest Solution", by Donoho, *Comm. Pure Appl. Math*, 59:797-829, 2004, Donoho provided sufficient conditions for obtaining an optimal $L_1$-norm solution that is sparse. Recent work on compressed sensing has further explored how $L_1$ constraints can be used for recovering a sparse signal sampled below the Nyquist rate.

$L_1$ regularized maximum likelihood can be cast as a constrained optimization problem. Although standard algorithms such as interior-point methods offer powerful theoretical guarantees (e.g., polynomial-time complexity, ignoring the cost of evaluating the function), these methods typically require at each iteration the solution of a large, highly ill-conditioned linear system, which is potentially very difficult and expensive in terms of computing resources.

SUMMARY OF INVENTION

It is an object of the present invention to provide practical and efficient implementations of constrained optimization problems using the $L_1$-norm, hereinafter called $L_1$ constraint optimization.

It is a further object of the present invention to provide practical implementations of $L_1$ constraint optimization under box constrains, and in particular in the presence of upper bound constraints.

The above objects are met in a method for $L_1$ constraint optimization under box constrains, implemented by providing a data processing device to implement the following steps: (I) accessing a vector v' to be projected onto an $L_1$-norm of value z, where $v' \in \mathbb{R}^n$; (II) taking the absolute value of the elements of v' to create a transformed vector v, where $v \in \mathbb{R}^n_+$; (III) accessing bound constraints [a,b], where [a] is a vector of lower bound constraints and [a] is a vector of upper bound constraints; (IV) transforming bound constraints [a,b] to [0,b] by identifying equivalent positive upper bounds; (V) identifying a projection vector solution, x, as the projection of vector v onto the $L_1$-norm as limited by upper bounds b; (VI) defining a projection vector solution x' by performing element-wise multiplication of x by the sign of v' according to $x' = x \odot \text{sign}(v')$.

In this approach, it is preferred that step (III) further include redefining b as $b \leftarrow \min(b, v)$.

Also in this approach, projection vector solution x is defined as $$\min_x \frac{1}{2} \|x - v\|_2^2$$

such that $\{x \in \Omega : \|x\|_1 \leq z, 0 \preceq x \preceq b\}$, where a non-empty set $\Omega$ signifies the existence of a solution, $0 \in \mathbb{R}^n$ is a vector of all zeros, $b \in \mathbb{R}^n_+$ and notation $(p \preceq q)$ denotes that $p_i \leq q_i, \forall i \in \{1, n\}$. Preferably, elements $\alpha$ of $\Omega$ are defined as $\alpha \in \Omega$ where $\|\alpha\|_1 \leq z$ and $0 \leq \alpha \leq b$.

In one embodiment, step (V) includes the following sub-steps: (a) identifying a first intermediate projection vector as the unbounded projection of vector v onto the $L_1$-norm; (b) IF there is an element of the intermediate projection vector that is larger than its corresponding upper bound as defined in b, THEN changing the element of the intermediate projection vector to match its corresponding upper bound as defined b, and IF the intermediate projection vector is not on the $L_1$-norm, THEN moving the intermediate projection vector to the $L_1$-norm while maintaining constant all elements of the intermediate projection vector that are already fixed at their corresponding upper bound, and returning to the start of step (b), ELSE returning to start of step (b); (c) defining the intermediate projection vector as the projection vector solution x. Preferably, in sub-step (a), the unbounded projection of vector v onto the $L_1$-norm is by Euclidean projection.

In a preferred embodiment, step (V) includes the following sub-steps: (a) defining a memory space $L \leftarrow \{1, 2 \ldots n\}$; (b) defining a memory space $U \leftarrow [\ ]$, where $[\ ]$ denotes a null set with no elements; (d) defining a memory space $\bar{z} \leftarrow (z - \Sigma_{i:i \in U} b_i)$; (e) defining a memory space $\bar{v} \leftarrow \{v_i : i \in L\}$; (f) defining an intermediate projection vector $\bar{x}$ as the unbounded Euclidean projection of vector $\bar{v}$ onto $\bar{z}$; (g) defining a memory space $W \leftarrow \{i : \bar{x}_i \geq b_i\}$; (h) updating L as $L \leftarrow L - W$; (i) updating U as $U \leftarrow U \cup W$; (j) updating $x[L]$ as $\bar{x}[L]$; (k) updating $x[U]$ as $x[U] \leftarrow b[U]$; (l) if $W == [\ ]$, then return to step (d); and (m) return projection vector solution x.

In this approach, the unbounded Euclidean projection of vector $\bar{v}$ onto $\bar{z}$ is preferably defined as: sorting $\bar{v}$ into a memory space $\mu$, where $\mu_1 \geq \mu_2 \geq \ldots \geq \mu_L$; finding $$\tau = \max\left\{j \in [L] : \mu_j - \frac{1}{j}\left(\sum_{r=1}^{j} \mu_r - \bar{z}\right) > 0\right\},$$

where [L] denotes the set of integers 1 to L; defining $$\theta = \frac{1}{\tau}\left(\sum_{r=1}^{\tau} \mu_r - \bar{z}\right);$$

and defining intermediate projection vector $\bar{x}$ as $\bar{x}_i=\max\{(\bar{v}_i-\theta),0\}$.

Also in an embodiment of the present invention, step (V) includes the following sub-steps: (a) sorting quantities $(v_i-b_i)$'s in ascending order, and arranging x and b in the same order to define $\hat{x}$ and $\hat{b}$ to respectively; (b) determining an index $\rho$ where $1 \leq \rho \leq n$ and all $\hat{x}_{\rho+k}$ are fixed at their respective upper bound $\hat{b}_{\rho+k}$ for a positive value of k; (c) defining elements $\hat{x}_k$ where k are vector indices ranging from 0 to $\leq \rho$, as the solution of unbounded Euclidean projection of $v_k$ onto z; (d) defining elements $\hat{x}_{\rho+k}$, where k>0 and $(\rho+k) \leq n$, as being fixed at their corresponding upper bound value $\hat{b}_{\rho+k}$; (e) defining $\hat{x}$ as $\hat{x}_k \cup \hat{x}_{\rho+k}$; and (f) defining x as $\hat{x}$ rearranged in the original order of x.

Within this approach, in sub-step (b), $\rho$ is the first vector index i where projection of $v_i$ onto z is not smaller than $b_i$, according to the order of $\hat{b}$.

Also within this approach, sub-step (b) includes: (i) defining a variable memory spaces low and high as {low, high}←{1,n}; (ii) defining memory space w←(v−b) sorted in ascending order; (iii) defining $$mid \leftarrow \left\lceil \frac{low + high}{2} \right\rceil;$$

(iv) defining $\bar{z} \leftarrow z - \Sigma_{i:\omega_{mid}} b_i$; (v) defining $\bar{v} \leftarrow \{v_i : w_i < w_{mid}\}$; (vi) defining $\bar{b} \leftarrow \{b_i : w_i < w_{mid}\}$; (vii) defining a reduce problem as $\bar{x} \leftarrow$ unbounded Euclidean projection of $\bar{v}$ onto $\bar{z}$; (viii) IF $(\bar{x}_i < \bar{b}_i, \forall i)$, THEN {low, high}←{mid, high}, ELSE {low, high}←{low, mid}; (ix) IF (low$\geq$high) then return to return to sub-step (iii); (x) assigning $\rho \leftarrow$ high.

Within this approach, in sub-step (vii), the reduced problem of unbounded Euclidean projection of v onto z is defined as: sorting $\bar{v}$ into a memory space $\mu$ where $\mu_1 \geq \mu_2 \geq \ldots \geq \mu_n$; finding $$\tau = \max\left\{j \in [n] : \mu_j - \frac{1}{j}\left(\sum_{r=1}^{j} \mu_r - \bar{z}\right) > 0\right\},$$

where [n] denotes the set of integers 1 to n; defining $$\theta = \frac{1}{\tau}\left(\sum_{r=1}^{\tau} \mu_r - \bar{z}\right);$$

and defining $\bar{x}$ as $\bar{x}_i = \max\{(\bar{v}_i - \theta), 0\}$.

Also in a preferred embodiment, step (V) includes the following sub-steps: (a) defining memory space vvb by merging v and (v−b), wherein vvb is indexed from 0 to (2n−1); (b) defining an uncertainty interval $[\theta_L, \theta_R]$ of vvb ranging form a left index position of vvb (idx_$\theta_L$) to a right index position of vvb (idx_$\theta_R$), and setting idx_$\theta_L$=0 and idx_$\theta_R$=(2n−1); (c) defining variable space $S_{all}$ equal to the sum of all $v_i$; (d) defining index sets $S_L$ and $S_R$ and cardinality variable memory spaces $n_L$ and $n_R$, and initialize $S_L$, $S_R$, $n_L$ and $n_R$ to zero; (e) IF (idx_$\theta_R$)>[(idx_$\theta_L$)+1], then implement sub-steps (f) to (i), ELSE skip to sub-step (j); (f) defining variable memory space $\theta_{pivot}$, and setting $\theta_{pivot}$ equal to the median of the vector elements within the current uncertainty interval of vvb (i.e. from idx_$\theta_L$ to idx_$\theta_R$); (g) matching $\theta_{pivot}$ to a vector element within the current uncertainty interval, and storing the index of the matched vector element in memory space idx_$\theta_{pivot}$; (h) determining $z_{pivot}$ according to the following relation:

$$z_{pivot} = (S_{all} - S_L - S_R) - (n - n_L - n_R)\theta_{pivot} - \left(\sum_{i:\theta_{pivot} \leq v_i - b_i < \theta_R} (v_i - b_i - \theta_{pivot})\right) - \left(\sum_{i:\theta_L < v_i \leq \theta_{pivot}} (v_i - \theta_{pivot})\right);$$

(i) IF $z_{pivot} > z_{target}$ then update idx_$\theta_L$, $S_L$ and $n_L$ according to the following relations:

$$idx\_\theta_L \leftarrow idx\_\theta_{pivot}$$

$$S_L \leftarrow S_L + \sum_{i:\theta_L < v_i \leq \theta_{pivot}} v_i$$

$$n_L \leftarrow n_L + \sum_{i:\theta_L < v_i \leq \theta_{pivot}} 1$$

and return to sub-step (e),

ELSE update idx_$\theta_R$, $S_R$ and $n_R$ according to the following relations:

$$idx\_\theta_R \leftarrow idx\_\theta_{pivot}$$

$$S_R \leftarrow S_R + \sum_{i:\theta_{pivot} \leq v_i - b_i < \theta_R} (v_i - b_i)$$

$$n_R \leftarrow n_R + \sum_{i:\theta_{pivot} \leq v_i - b_i < \theta_R} 1$$

and return to sub-step (e);

(j) defining $\theta^*$ as $$\theta^* = \frac{\sum_{i \in U^*} b_i + \sum_{i \in C^*} v_i - z_{target}}{\|C^*\|};$$

and (k) defining projection vector solution x as $$x_i = \begin{cases} 0 & \text{if } v_i \leq \theta^* \\ b_i & \text{if } v_i - b_i \geq \theta^* \\ v_i - \theta & \text{if } v_i - b_i < \theta^*. \end{cases}$$

Within this approach, in sub-step (j), $\theta^*$ is determined according to the following relation:

$$\theta^* \leftarrow \frac{(S_{all} - S_L - S_R - z_{target})}{(n - n_L - n_R)}.$$

Additionally within this approach, in sub-step (a), the original index i information of vectors v and (v−b) is preferably preserved.

Also in a preferred embodiment, step (V) includes the following sub-steps:

---

(a) defining vvb ← merge(v, (v − b)); (b) defining (idx_$\theta_L$, idx_$\theta_R$) ← (0, 2n − 1); (c) defining $S_{all}$ ← sum(v); (d) defining ($n_L$, $S_L$) ← 0; (e) defining ($n_R$, $S_R$) ← 0; (f) while idx_$\theta_R$ > idx_$\theta_L$ + 1 do
   $\theta_{pivot}$ ← select a pivot point within idx_$\theta_L$ and idx_$\theta_R$,
   partition vvb at $\theta_{pivot}$ between idx_$\theta_L$ and idx_$\theta_R$,
   idx_$\theta_{pivot}$ ← index($\theta_{pivot}$),
   Evaluate $z_{pivot}$ according to $$z_{pivot} = (S_{all} - S_L - S_R) - (n - n_L - n_R)\theta_{pivot} - \left(\sum_{i:\theta_{pivot} \leq (v_i - b_i) < \theta_R}(v_i - b_i - \theta_{pivot})\right) - \left(\sum_{i:\theta_L < v_i \leq \theta_{pivot}}(v_i - \theta_{pivot})\right),$$

if $z_{pivot} > z_{target}$ then
   idx_$\theta_L$ ← idx_$\theta_{pivot}$,
   update ($n_L$, $S_L$) according to the following relations:

$$S_L \leftarrow S_L + \sum_{i:\theta_L < v_i \leq \theta_{pivot}} v_i$$

$$n_L \leftarrow n_L + \sum_{i:\theta_L < v_i \leq \theta_{pivot}} 1$$

else
   idx_$\theta_R$ ← idx_$\theta_{pivot}$,
   update ($n_R$, $S_R$) according to the following relations:

$$S_R \leftarrow S_R + \sum_{i:\theta_{pivot} \leq v_i - b_i < \theta_R}(v_i - b_i)$$

$$n_R \leftarrow n_R + \sum_{i:\theta_{pivot} \leq v_i - b_i < \theta_R} 1$$

end if
end while
(g) defining $\theta^*$ ← ($S_{all}$ − $S_L$ − $S_R$ − $z_{target}$)/(n − $n_L$ − $n_R$); and (h) returning x according to the following relations:

$$x_i = \begin{cases} 0 & \text{if } v_i \leq \theta^* \\ b_i & \text{if } v_i - b_i \geq \theta^* \\ v_i - \theta & \text{if } v_i - b_i < \theta^*. \end{cases}$$

---

Within this approach, $\theta_{pivot}$ is selected as the median of vvb within the range defined from idx_$\theta_L$ to idx_$\theta_R$.

A preferred embodiment of the present invention is also a method for $L_1$ constraint optimization under box constrains, having: providing a data processing device to implement the following steps: (I) accessing a vector v, where v∈$\mathbb{R}^n_+$; (II) accessing upper bound constraints b, where b is a vector of upper bound constraints; (III) identifying a projection vector solution, x, as the projection of vector v onto the $L_1$-norm as limited by upper bounds b, wherein projection vector solution x is defined as $$\min_x \frac{1}{2}\|x - v\|_2^2$$

such that $\{x \in \Omega : \|x\|_1 \leq z, 0 \preceq x \preceq b\}$, where elements $\alpha$ of $\Omega$ are defined as $\alpha \in \Omega$ where $|\alpha|_1 \leq z$ and $0 \leq \alpha \leq b$, $0 \in R^n$ is a vector of all zeros, b∈$\mathbb{R}^n_+$; and notation (p $\preceq$ q) denotes that $p_i \leq q_i$, $\forall i \in \{1, n\}$.

In this method, step (II) further includes redefining b as b←min(b, v).

Also in this method, step (III) includes the following sub-steps: (a) identifying a first intermediate projection vector as the unbounded Euclidean projection of vector v onto the $L_1$-norm; (b) IF there is an element of the intermediate projection vector that is larger than its corresponding upper bound as defined in b, THEN fixing said element of the intermediate projection vector at its corresponding upper bound as defined b, and IF the intermediate projection vector is not on the $L_1$-norm, THEN moving the intermediate projection vector to the $L_1$-norm while maintaining constant all elements of the intermediate projection vector already fixed at their corresponding upper bound, and returning to the start of step (b), ELSE returning to start of step (b); (c) defining the intermediate projection vector as the projection vector solution x.

Alternatively, step (III) includes the following sub-steps: (a) defining a memory space L←{1, 2 . . . n}; (b) defining a memory space U←[ ], where [ ] denotes a null set with no elements; (d) defining a memory space $\bar{z}$←(z−$\Sigma_{i:i \in U} b_i$); (e) defining a memory space $\bar{v}$←{$v_i$:i∈L}; (f) defining an intermediate projection vector $\bar{x}$ as the unbounded Euclidean projection of vector $\bar{v}$ onto $\bar{z}$; (g) defining a memory space W←{i:$\bar{x}_i \geq b_i$}; (h) updating L as L←L−W; (i) updating U as U←U∪W; (j) updating x[L] as x[L]←$\bar{x}$[L]; (k) updating x[U] as x[U]←b[U]; (l) if W==[ ], then return to step (d); and (m) return projection vector solution x.

In this method, step (III) may includes the following alternate sub-steps: (a) sorting quantities ($v_i − b_i$)'s in ascending order, and arranging x and b in the same order to define $\hat{x}$ and $\hat{b}$ respectively; (b) determining an index $\rho$ where 1≤$\rho$≤n, $\rho$ is the first index according to the order of $\hat{b}$ where projection of $v_\rho$ onto z is not smaller than $b_\rho$, and all $\hat{x}_{\rho+k}$ are fixed at their respective upper bound $\hat{b}_{\rho+k}$ for a positive value of k; (c) defining elements $\hat{x}_k$ where k are vector indices ranging from 0 to ≤$\rho$, as the solution of unbounded Euclidean projection of $v_k$ onto z; (d) defining elements $\hat{x}_{\rho+k}$ where k>0 and ($\rho$+k)≤n, as being fixed at their corresponding upper bound value $\hat{b}_{\rho+k}$; (e) defining $\hat{x}$ as $\hat{x}_k \cup \hat{x}_{\rho+k}$; and (f) defining x as $\hat{x}$ rearranged in the original order of x.

Following this approach, sub-step (b) includes: (i) defining a variable memory spaces low and high as {low, high}←{1, n}; (ii) defining memory space w←(v−b) sorted in ascending order; (iii) defining $$mid \leftarrow \left\lceil \frac{low + high}{2} \right\rceil;$$

(iv) defining $\bar{z}$←z−$\Sigma_{i:w_i > w_{mid}} b_i$; (v) defining $\bar{v}$←{$v_i$:$w_i < w_{mid}$}; (vi) defining $\bar{b}$←{$b_i$:$w_i < w_{mid}$}; (vii) defining a reduce problem as $\bar{x}$← unbounded Euclidean projection of $\bar{v}$ onto $\bar{z}$; (viii)

IF ($\bar{x}_i < \bar{b}_i \forall i$), THEN {low,high}←{mid,high}, ELSE {low,high}←{low,mid}; (ix) IF (low≧high) then return to return to sub-step (iii); (x) assigning ρ←high.

It is also preferred that step (III) alternatively includes the following sub-steps: (a) defining memory space vvb by merging v and (v−b), wherein vvb is indexed from 0 to (2n−1); (b) defining an uncertainty interval [$\theta_L, \theta_R$] of vvb ranging form a left index position of vvb (idx_$\theta_L$) to a right index position of vvb (idx_$\theta_R$), and setting idx_$\theta_L$=0 and idx_$\theta_R$=(2n−1); (c) defining variable space $S_{all}$ equal to the sum of all $v_i$; (d) defining index sets $S_L$ and $S_R$ and cardinality variable memory spaces $n_L$ and $n_R$, and initialize $S_L$, $S_R$, $n_L$ and $n_R$ to zero; (e) IF (idx_$\theta_R$)>[(idx_$\theta_L$)+1], then implement sub-steps (f) to (i), ELSE skip to sub-step (j); (f) defining variable memory space $\theta_{pivot}$, and setting $\theta_{pivot}$ equal to the median of the vector elements within the current uncertainty interval of vvb (i.e. from idx_$\theta_L$ to idx_$\theta_R$); (g) matching $\theta_{pivot}$ to a vector element within the current uncertainty interval, and storing the index of the matched vector element in memory space idx_$\theta_{pivot}$; (h) determining $z_{pivot}$ according to the following relation:

$$z_{pivot} = (S_{all} - S_L - S_R) - (n - n_L - n_R)\theta_{pivot} - \left(\sum_{i:\,\theta_{pivot} \le (v_i - b_i) < \theta_R} (v_i - b_i - \theta_{pivot})\right) - \left(\sum_{i:\,\theta_L < v_i \le \theta_{pivot}} (v_i - \theta_{pivot})\right);$$

(i) IF $z_{pivot} > z_{target}$ then update idx_$\theta_L$, $S_L$ and $n_L$ according to the following relations:

$$\text{idx}\_\theta_L \leftarrow \text{idx}\_\theta_{pivot}$$

$$S_L \leftarrow S_L + \sum_{i:\,\theta_L < v_i \le \theta_{pivot}} v_i$$

$$n_L \leftarrow n_L + \sum_{i:\,\theta_L < v_i \le \theta_{pivot}} 1$$

and return to sub-step (e),

ELSE update idx_$\theta_R$, $S_R$ and $n_R$ according to the following relations:

$$\text{idx}\_\theta_R \leftarrow \text{idx}\_\theta_{pivot}$$

$$S_R \leftarrow S_R + \sum_{i:\,\theta_{pivot} \le v_i - b_i < \theta_R} (v_i - b_i)$$

$$n_R \leftarrow n_R + \sum_{i:\,\theta_{pivot} \le v_i - b_i < \theta_R} 1$$

and return to sub-step (e);
(j) defining $\theta^*$ as $$\theta^* = \frac{\sum_{i \in U^*} b_i + \sum_{i \in C^*} v_i - z_{target}}{\|C^*\|};$$

and
(k) defining projection vector solution x as $$x_i = \begin{cases} 0 & \text{if } v_i \le \theta^* \\ b_i & \text{if } v_i - b_i \ge \theta^* \\ v_i - \theta & \text{if } v_i - b_i < \theta^* \end{cases}.$$

Following this approach, in sub-step (j), $\theta^*$ is preferably determined according to the following relation:

$$\theta^* \leftarrow \frac{(S_{all} - S_L - S_R - z_{target})}{(n - n_L - n_R)}.$$

Also in this approach, in sub-step (a), the original index i information of vectors v and (v−b) is preserved.

It is also preferred that step (III) alternatively include the following sub-steps:

---

(a) defining vvb ← merge(v, (v − b)); (b) defining (idx_$\theta_L$, idx_$\theta_R$) ← (0, 2n − 1); (c) defining $S_{all}$ ← sum(v); (d) defining ($n_L$, $S_L$) ← 0; (e) defining ($n_R$, $S_R$) ← 0; (f) while idx_$\theta_R$ > idx_$\theta_L$ + 1 do $\theta_{pivot}$ ← the median of vvb within indices idx_$\theta_L$ and idx_$\theta_R$, partition vvb at $\theta_{pivot}$ between idx_$\theta_L$ and idx_$\theta_R$, idx_$\theta_{pivot}$ ← index($\theta_{pivot}$), Evaluate $z_{pivot}$ according to $$z_{pivot} = (S_{all} - S_L - S_R) - (n - n_L - n_R)\theta_{pivot} - \left(\sum_{i:\,\theta_{pivot} \le (v_i - b_i) < \theta_R} (v_i - b_i - \theta_{pivot})\right) - \left(\sum_{i:\,\theta_L < v_i \le \theta_{pivot}} (v_i - \theta_{pivot})\right),$$

if $z_{pivot} > z_{target}$ then
  idx_$\theta_L$ ← idx_$\theta_{pivot}$,
  update ($n_L$, $S_L$) according to the following relations:

$$S_L \leftarrow S_L + \sum_{i:\,\theta_L < v_i \le \theta_{pivot}} v_i$$

$$n_L \leftarrow n_L + \sum_{i:\,\theta_L < v_i \le \theta_{pivot}} 1$$

else
  idx_$\theta_R$ ← idx_$\theta_{pivot}$,
  update ($n_R$, $S_R$) according to the following relations:

$$S_R \leftarrow S_R + \sum_{i:\,\theta_{pivot} \le v_i - b_i < \theta_R} (v_i - b_i)$$

$$n_R \leftarrow n_R + \sum_{i:\,\theta_{pivot} \le v_i - b_i < \theta_R} 1$$

end if
end while;
(g) defining $\theta^*$ ← ($S_{all} - S_L - S_R - z_{target}$)/(n − $n_L$ − $n_R$); and (h) returning x according to the following relations:

$$x_i = \begin{cases} 0 & \text{if } v_i \le \theta^* \\ b_i & \text{if } v_i - b_i \ge \theta^* \\ v_i - \theta & \text{if } v_i - b_i < \theta^* \end{cases}.$$

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 10C shows a close-up are region of the results of FIG. 10A where both methods have converged at the truth parameter vector.

FIGS. 11A and 11B show the results of comparing a standard quadratic programming (QP) implementation approach provided by MATLAB® versus the approach of the present invention.

DESCRIPTION OF THE PREFERRED EMBODIMENTS

Herein, the behavior of $L_1$ constraint optimization under the presence of upper bound constraints is explored. Traditional $L_1$ constraint optimization assumes no upper bound constraints, and thus assumes an infinite upper bound on the magnitude of the predicates. An upper bound constraint, on the other hand, places a limit on the data value of a vector element, i.e. on a data entry.

The idea of upper bound constraints can be more easily understood by means of a simple example. Suppose one wants to transmit a signal of length n (i.e. of n signal data entries) that is a combination of signals originating from m different sources. Further suppose that at the receiver side, one has m sets of receivers to decode the entire transmitted signal of n signal data entries. Based on the receiver set $i \in \{1, m\}$, the peak signal strength (i.e. the peak, signal data value) that the receivers can handle can be different for each individual receiver. It is further noted that the peak signal strength of any of the receivers can be lower than any of the individual signal data values in the transmitted signal. This kind of problem is not handled by traditional $L_1$ projection (i.e. $L_1$ constraint optimization). A specific example of this problem is illustrated in the transmission system of FIGS. 1 and 2.

Figure 1:
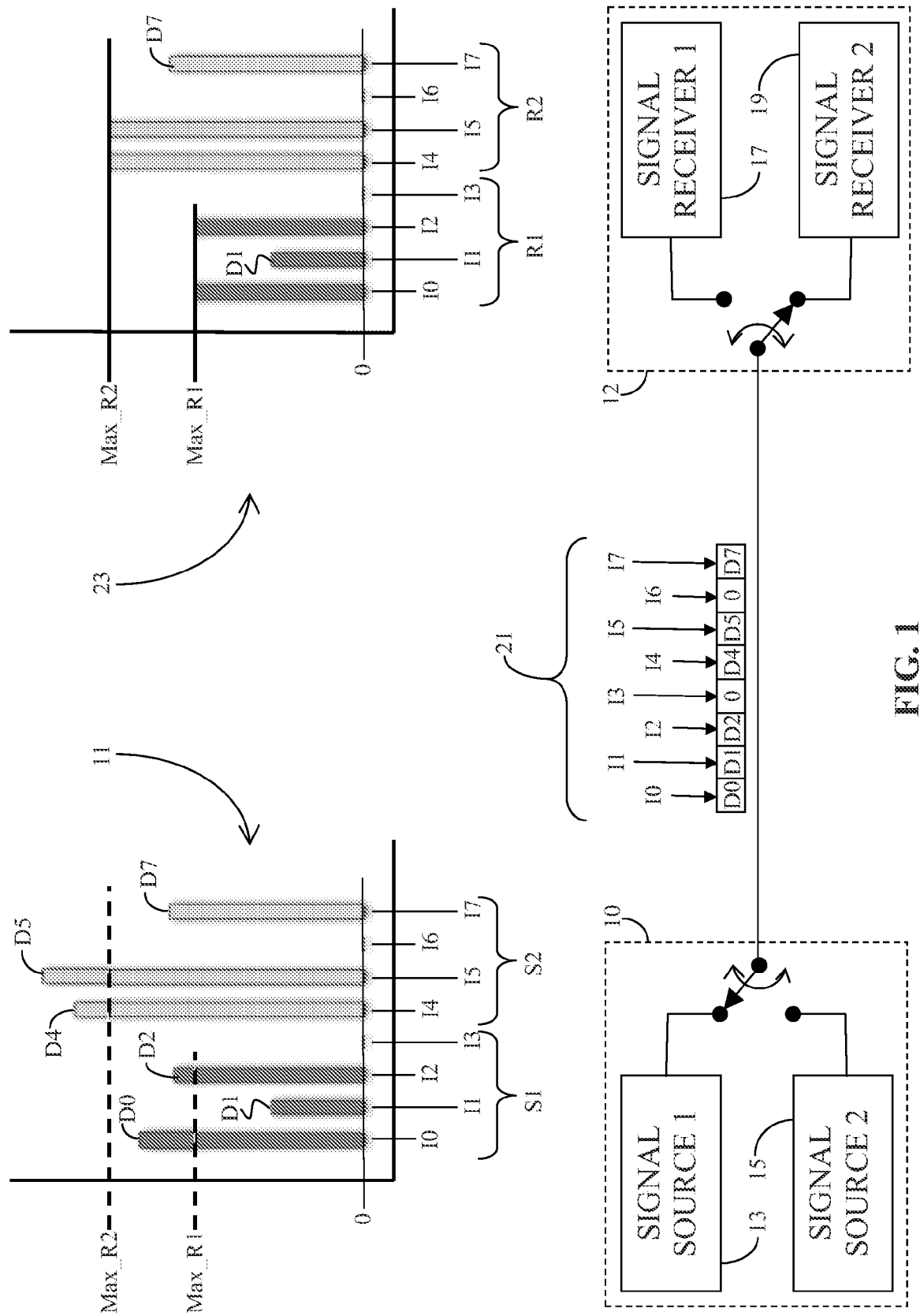
FIG. 1 illustrates a problem associated with a transmission system with unbounded constraints.

In FIG. 1, a transmission system may include a transmitter block 10 for sending a transmitted signal 21 to a receiver block 12. In the present example, transmitter block 10 includes a first signal source 13 and a second signal source 15. Similarly, receiver block 12 includes a first signal receiver 17 and a second signal receiver 19.

A complete source signal 11 is a combination of signal contributions from first signal source 13 and second signal source 15. Preferably source signal 11 is comprised of eight individual signal data entries (i.e. n=8), each identified by a different index number, I0-I7. First signal source 13 provides a first source part S1 comprised of four signal data entries (I0-I3), and second signal source 15 providing a second source part S2 comprised of four signal data entries (I4-I7). The individual signal data values of data entries I0-I7 are represented by corresponding data values D0-D7.

Within receiver block 12, first signal receiver 17 is preferably responsible for recovering a first received part R1 of transmitted signal 21 corresponding to first source part S1 (i.e. signal data entries I0-I3). Similarly, second signal receiver 19 is responsible for recovering a second received part R2 of transmitted signal 21 corresponding to second source part S2 (i.e. signal data entries I4-I7). Together, the first and second received parts R1 and R2 comprised the received signal 23.

In the present example, first signal receiver 17 has a peak signal strength defined as Max_R1, which specifies the maximum signal data value it can accept, and any received signal data value above this peak value is clamped to a value of Max_R1. Similarly, second signal receiver 19 has a peak signal strength defined as Max_R2, and any received signal data value above this peak value is clamped to a value of Max_R2.

As is shown, first source part S1 includes data values above Max_R1, and the second source part S2 includes data values above Max_R2. For example, signal data values D0 and D2 of data entries I0 and I2 are above peak signal strength Max_R1 of first signal receiver 17, and signal data values D4 and D5 of data entries I4 and I5 are above peak signal strength Max_R2 of second signal receiver 19.

Corresponding to source signal 11, transmitted signal 21 is likewise comprised of n signal data entries (I0-I7), where n=8. Assuming that each of data values D0-D7 is one byte, then the signal data portion of transmission signal 21 is 64 bits long (8 entries×8 bits per bytes), excluding vector index information, transmission header information, ECC, etc.

For improved efficiency, any signal data entry whose data value is zero can be represented by a single data bit set to a logic 0. Using this zero-bit provides a savings of 7 bits for representing a signal data value of 0. In the present case, data entries at indices I3 and I6 each have a signal data value of 0. Therefore, transmission signal 21 shows a zero-bit at index I3 and at index I6, but shows the full 8-bit, signal data values of D0, D1, D2, D4, D5 and D7 at indices I0, I1, I3, I4, I5 and I7, respectively. Thus, the bit-length of the data portion of transmission signal 21 is (six 8-bit data entries+two zero-bit entries), or 50 bits total.

In the present case, the received signal 23 is markedly different from the source signal 11. It is noted that since signal data values D0 and D2 are above the peak signal strength rating of first signal receiver 17, the exact value of these data signals is lost at first signal receiver 17, and their corresponding indices I0 and I2 are clamped at a value of Max_R1. Similarly, since signal data values D4 and D5 are above the peak signal strength rating of the second signal receiver 19, these signal data values are lost at second signal receiver 19, and their corresponding indices I4 and I5 are clamped at a value of Max_R2. Thus, transmitting signal data values above Max_R1 for the first signal receiver 17, or above Max_R2 for the second signal receiver 19, is a waste of transmission bandwidth. Placing upper bound constraints on the source signal 11 (i.e. the signal to be transmitted) can improve the efficiency of the system.

Figure 2:
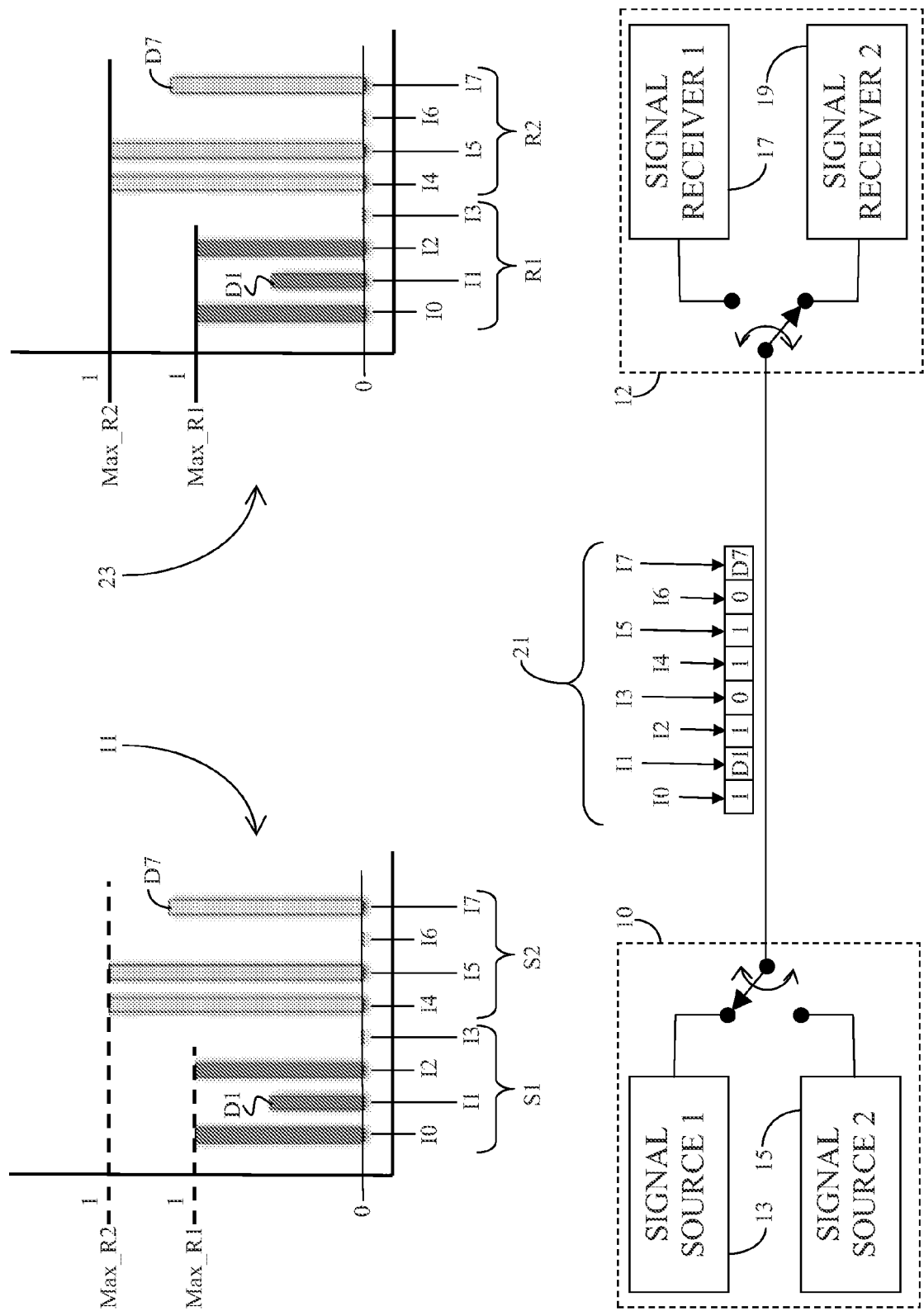
FIG. 2 illustrates a transmission system with bounded constraints.

With reference to FIG. 2, where all elements similar to FIG. 1 have similar reference characters and are described above, an upper bound constraint of Max_RI corresponding to the peak signal strength of first signal receiver 17 is applied to first source part S1 of source signal 11. Similarly, an upper bound constraint of Max_R2 corresponding to the peak signal strength of second signal receiver 19 is applied to second part S2 of source signal 11. Because of the application of upper bound constraints Max_R1 and Max_R2 on source signal 11, the received signal 23 correctly matches source signal 11.

Like in FIG. 1, a signal data value of 0 may be represented by a single data bit set to a logic 0 (i.e. a zero-bit). To further improve efficiency, however, any signal data values equal to, or greater than, a corresponding peak signal strength value can also represented by a single data bit. In this case, the signal data value is set to a logic 1 (i.e. a one-bit). As shown, signal data entries at indices I0, I2, I4 and I5 of source signal 11 are clamped at their respective peak signal strength values. Therefore, transmission signal 21 has a one-bit at indices I0, I2, I4 and I5, and has a zero-bit at indices I3 and I6. Full, 8-bit, signal data values of D1 and D7 are required only for indices I1 and I7, respectively. Consequently in the present example, the bit-length of the data portion of transmission signal 21 is (two 8-bit data entries+four one-bit entries+two zero-bit entries), or 22 bits total.

Assuming 8-bits per data entry and a cost of just 1 bit for transmitting a signal data value of 0, the effective sparsity of the unbounded example in FIG. 1 is 50/64 for $L_1$. By contrast, the effective sparsity of the bounded example of FIG. 2 is 22/64 for $L_1$, assuming a cost of just 1 bit for transmitting either a signal data value of 0 or an upper bounded signal data value.

Having thus introduced the concept of upper bound constraints, it is beneficial to further introduce a second concept prior to presenting a detailed derivation of the present invention. This second concept is that of projection onto a probabilistic simplex, or more specifically, an efficient method for projection onto the probabilistic simplex under unbounded conditions. Following this, the concept of associating upper bound constraints to projection onto the probabilistic simplex is introduced. As is explained more fully below, this will facilitate the discussion of projection onto the $L_1$-norm (i.e. $L_1$ constraint optimization).

In geometry, a simplex is a generalization of the notion of a triangle or tetrahedron to an arbitrary dimension, or vector. Specifically, an n-simplex is an n-dimensional polytope with n+1 vertices, of which the simplex is the convex hull.

Figure 3A:
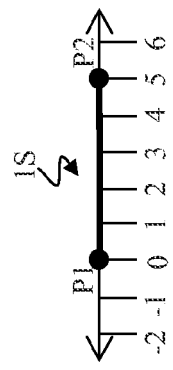
FIGS. 3A-3C show three examples of a simplex.

For example with reference to FIG. 3A, a 1-simplex (1S) is a line defined by two vertices, P1 and P2, in a one-dimensional space. In the present example, the length between the vertices is 5 units, and thus simplex 1S may be described as being of size z=5.

Figure 3B:
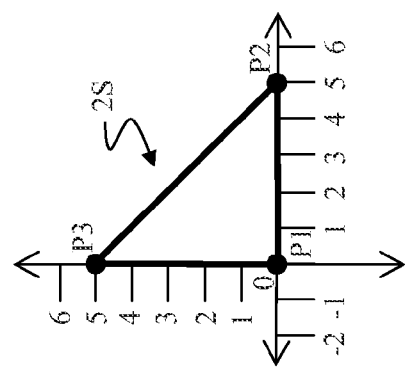

FIG. 3B shows a 2-simplex (2S), which forms a triangle defined by three vertices, P1, P2 and P3, in a two-dimensional space. Like in the example of FIG. 3A, the length between the vertices of simplex 2S is 5 units, and therefore simplex 2S may also be described as being of size z=5.

Figure 3C:
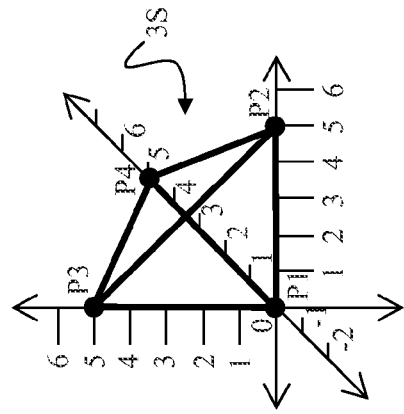

With reference to FIG. 3C, a 3-simplex (3S) is a tetrahedron defined by four vertices, V1, V2, V3 and V4, in a three-dimensional space. For illustrative purposes, the length between the vertices of simplex 3S is also 5 units, and it too may therefore be described as being of size z=5.

Thus, each of simplex 1S, 2S and 3S is of size z=5, and differ only by their number of dimensions. This concept may be extended to an arbitrary n-dimensional space.

A discussion of unbounded projection onto the probabilistic simplex is presented in "Efficient Projections Onto the $l_1$-ball for Learning in High Dimensions", *ICML '08: Proc. 25th Intl. Conf. Machine learning*, 2008, by Duchi et al, which is herein incorporated in its entirety by reference. As Duchi explains, it is helpful to rearrange a vector that is to be projected, in descending order according to its vector elements (i.e. entry data values). The basic intuition is that once the vector to be projected is ordered, the projection can be calculated in linear time. It is noted, however, that although the projection step is linear, the vector sorting/ordering step is still O(n log n). Duchi et al. further discuss the similarities between simplex projection and $L_1$ projection.

Applicants respectfully content that once upper bound constraints are introduced, vector ordering does not remain as simple as in previous works. Herein below are presented several algorithms for handling different types of problems, including those with upper bound constraints.

Figure 4A:
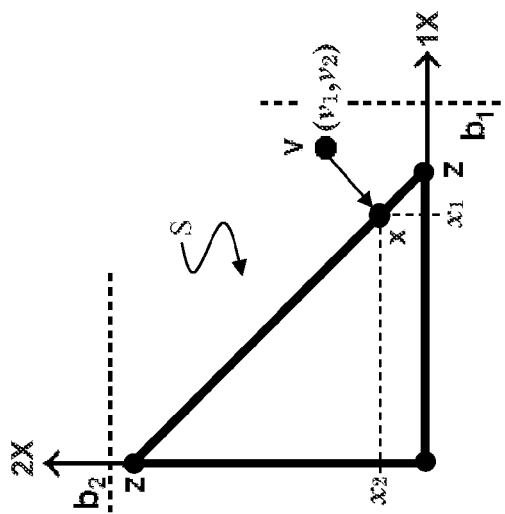
FIGS. 4A-4C show three examples of projection onto a 2-simplex.
Figure 4B:
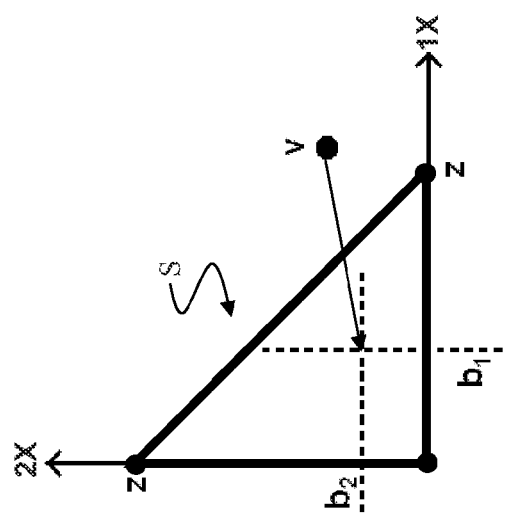
Figure 4C:
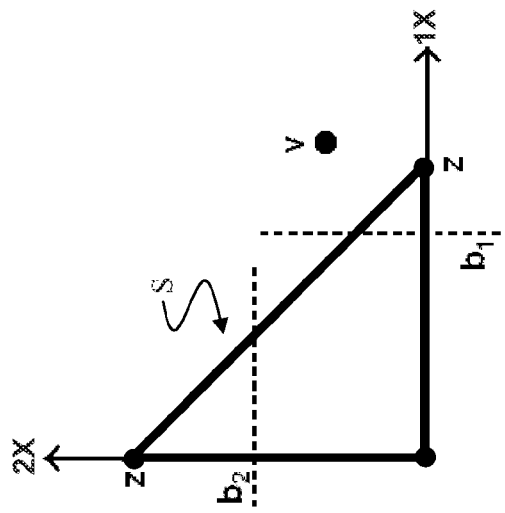

With reference to FIGS. 4A-4C, three different types of problems may be defined as three different types of projection onto a probabilistic simplex. For ease of illustration, FIGS. 4A-4C illustrate projection onto a 2-simplex S (i.e. a triangle) in a two-dimensional space defined by axis dimensions 1× and 2×.

In the case of FIG. 4A, point v, which may represent a two-dimensional vector v having vector elements $(v_1, v_2)$, is to be projected onto side z-z of simplex S. In the present case, simplex S is of size z=z. Dotted line $b_1$ defines an upper bound constraint along the 1× dimension, and dotted line $b_2$ defines an upper bound constraint along the 2× dimension. Since simplex S is completely within the upper bound constraints, $b_1$ and $b_2$, the problem of FIG. 4A is essentially the same as an infinite bound (or unbounded) case, and the optimal projection of point v onto side z-z is point x at location $(x_1, x_2)$, which is the nearest point on side z-z to point v.

In the case of FIG. 4B, both upper bound constraints $b_1$ and $b_2$ are fully within simplex S, and side z-z is fully outside the box constraints defined by upper bounds $b_1$ and $b_2$. Consequently, projection onto side z-z is not permissible. This case reduces to the well-known case of $L_2$ minimization with bounds, and point v projects onto the nearest point on the box constraint (i.e. the boundary box whose limits are defined by $b_1$ and $b_2$).

FIG. 4C depicts the most general case where the box constraints defined by the intersecting upper bounds $b_1$ and $b_2$ traverses the simplex S and intersect at a point outside the simplex S. A method for $L_1$ projection in this case is defined below.

Each of the three cases depicted in FIGS. 4A-4C is addressed, in turn.

The first case of infinite bound (or unbounded) projection onto the simplex, as illustrated in FIG. 4a, may be identified as Euclidean projection onto the simplex. An algorithm for addressing this case is as follows.

For clarity, the present discussion begins with the task of performing Euclidean projection onto the positive simplex.

The most basic projection task considered herein can be formally described as the following optimization problem, for $v \in \mathbb{R}^n_+$ $$\min_x \frac{1}{2}\|x-v\|_2^2 \quad (1)$$

$$\text{s.t.} \sum_{j=1}^n x_j \le z,$$

$$x_i \ge 0 \forall i.$$

where z is the norm onto which v is being projected, and x is the projection vector solution. A pseudo-code describing the O(n log n) procedure for solving the above problem is presented in Algorithm 1.

---

Algorithm 1 Algorithm for unbounded projection onto the simplex

REQUIRE $v \in \mathbb{R}^n_+, z > 0$  // z is a number sort v into $\mu : \mu_1 \ge \mu_2 \ge \ldots \ge \mu_n$  // vector μ is vector v sorted in descending order Find $\tau = \max\left(j \in [n] : \mu_j - \frac{1}{j}\left(\sum_{r=1}^j \mu_r - z\right) > 0\right)$  // [n] denotes the set of integers 1 to n, and τ is the number of positive elements that the projection vector solution x is expected to have Define $\theta = \frac{1}{\tau}\left(\sum_{r=1}^\tau \mu_r - z\right)$  // θ is determined for only the elements of μ (i.e. v) that will yield a positive element for projection vector solution x RETURN x such that $x_i = \max\{(v_i - \theta), 0\}$  // determine projection vector solution x

---

The second case where the upper bound constrains are fully within the simplex, as illustrated by FIG. 4B, is not discussed herein since it reduces to $L_2$ minimization with bounds, which is well-understood in the art and is not a subject of the present invention.

The third case, where the box constraint defined by the upper bounds traverses the simplex and intersect at point outside the simplex, as illustrated by FIG. 4C, may be identified as upper-bound simplex projection, and is addressed in detail, as follows.

The above problem in Eq. (1) can be thought to have infinite upper bounds for the projected vector. The problem addressed herein is slightly more generic, with finite upper bounds. The most basic projection task considered can be formally described as the following optimization problem, for $v \in \mathbb{R}^n_+$ $$\min_x \frac{1}{2}\|x-v\|_2^2 \text{ s.t. } x \in \Omega: \left\{\sum_{j=1}^n x_j \le z, 0 \le x \le b\right\} \quad (2)$$

where elements α of Ω are defined as $\alpha \in \Omega$ where $|\alpha|_1 \le z$ and $0 \le \alpha \le b$ so that a solution exists as long as Ω is not empty; $0 \in R^n$ is a vector of all zeros; $b \in \mathbb{R}^n_+$ is the vector of upper bounds, and notation (p≤q) denotes that $p_i \le q_i, \forall i \in \{1,n\}$. Note that in the below-described algorithm, $$\sum_{j=1}^n v_j \ge z$$

is enforced because otherwise x=v is the optimal solution. The feasibility of the constraints with respect to each other is assumed, and the existence of a solution is guaranteed by set Ω being non-empty. Also note that if z1 ≤ b or v ≤ b, where 1 is a vector of all ones of size n, then the problem reduces to Euclidean projection onto the positive simplex, as is described above according to algorithm 1.

Next, several claims and lemmas are put forth, as follows:

$$x_i \le v_i, \forall i \in \{1, 2, \ldots, n\} \quad \text{Claim 1}$$

Proof: The norm of v is larger than the constraint z as mentioned earlier. Assume there is an optimal projection x*, with its element $x_i^* > v_i$. There exists another solution $\hat{x}^*$, such that $\hat{x}_i^* = v_i$ and all other elements of $\hat{x}^*$ are the same as x*, which is bounded and gives a lower value for the cost function, and hence is a better solution than x*, which is a contradiction.

$$b_i^{effective} = \min(b_i, v_i), \forall i \in \{1, 2, \ldots, n\} \quad \text{Claim 2}$$

Proof: The maximum value that $x_i$ can reach is either the upper bound $b_i$ or $v_i$ (from Claim 1), hence the effective upper bound $b_i^{effective}$ is the minimum of $b_i$ or $v_i$.

From this point onwards, it is assumed that $b_i = b_i^{effective} \forall i$, if not mentioned otherwise.

The next lemma addresses bounded projections.

Lemma 1. If $v_i > v_j$ and in optimal solution $x_i = 0$, then $x_j = 0$, irrespective of ordering of $b_i$ and $b_j$.

Proof: We need to prove lemma 1 for two cases.

[Case 1] $b_i \ge b_j$. In this case, if another solution is constructed such that $x_i$ and $x_j$ are switched keeping all other indices same, then there is a strict decrease in optimal value, generating a contradiction.

[Case 2] $b_i < b_j$. Assume $x_j > 0$. If another optimal solution $\hat{x}$ is constructed, such that $\hat{x}_i = \Delta$, $\hat{x}_j = x_j - \Delta$, where $\Delta = \min(b_i, x_j)$, and all the other indices are kept the same. It can be easily observed that the norm as well as the upper bound constraint are satisfied for $\hat{x}$.

Now it can be shown that:

New *obj func* value − Old *obj func* value =

$$(v_i - \hat{x}_i)^2 + (v_j - \hat{x}_j)^2 - (v_i - x_i)^2 - (v_j - x_j)^2 =$$

-continued
$$(v_i - \Delta)^2 + (v_j - x_j + \Delta)^2 - v_i^2 - (v_j - x_j)^2 = \Delta^2 - 2v_i\Delta + \Delta^2 +$$
$$2v_j\Delta - 2x_j\Delta = 2\Delta(\Delta - x_j) + 2(v_j - v_i)\Delta \le 2(v_j - v_i)\Delta < 0$$

which is a contradiction since a solution better than the optimal solution was constructed.

Bound constraints can now be incorporated into the Euclidean projection approach to create a more generic scenario containing the bounds on the predicted vector. An objective is to find the projection of a vector $v \in \mathbb{R}_+^n$ onto a feasible region, as follows:

$$\min_x \frac{1}{2}\|x - v\|_2^2 \text{ s.t. } \{x \in \Omega: \|x\|_1 \le z, a \le x \le b\} \quad (3)$$

where elements $\alpha$ of $\Omega$ are defined as $\alpha \in \Omega$ where $|\alpha|_1 \le z$ and $0 \le \alpha \le b$, and vectors a and b define the lower and upper bound constraints, respectively. Note that vector v is no longer contained within the positive real space. It is assumed that $\Omega$ is not empty [i.e. that $\Omega \ne \emptyset$ (the null set)], which guarantees feasibility and existence of a solution. The range in which the $x_j$'s should lie can now be characterized as three intervals identified herein as conditions (4) through (6):

$$[a_j, b_j] < 0 \quad (4)$$

$$0 < [a_j, b_j] \quad (5)$$

$$a_j \le 0 \le b_j \quad (6)$$

assuming that $a_j < b_j$ for all cases.

For the intervals not containing 0 [i.e. condition (4) and condition (5)], further analysis of the cost function in Eq. (3), leads to the observation that conditions (4) and (5), are equivalent under a sign flip. This can be obtained by the following transformations:

$$\|v-x\|_2^2 = \|(-v)-(-x)\|_2^2 \quad (7)$$

$$\|x\|_1 = \|-x\|_1 \quad (8)$$

$$x \in [a,b] < 0 \Leftrightarrow -x \in [-b,-a] > 0 \quad (9)$$

For such constraints, the bounds can be transformed such that all the boundaries are positive. Once this is done, one is left with one additional step, which is to subtract the lower bound from all the variables such that the new problem is similar to that of Euclidean projection. The following change of variables $$v - a = \hat{v} \quad (10)$$

$$x - a = \hat{x} \quad (11)$$

$$z - \|a\|_1 = \hat{z} \quad (12)$$

leads to the formulation in Eq. (3) with the lower bound $a_j$ terms equal to 0. Note that the change of variables is just a way to simplify the problem. The equivalent simpler problem is similar to Eq. (2), since the $L_1$ constraint and the simplex constraint are the same for positive variables. Also note that to keep the development simple, signs are flipped for the entire vector. Element wise manipulations can be performed when all the bounds do not belong to one particular case, without altering the form of the equations.

For the interval containing zero [condition (6)], it is noted that the objective function in Eq. (3) has an expression of the form $\|v-x\|_p$ (with p=2) and the norm constraint is equivalent to inclusion in $L_p$-norm ball (with p=1).

Given a candidate solution $x \in \mathbb{R}^n$, it is helpful to define a category of moves that can be used to generate a family of candidate solutions. This category of moves is hereinafter identified as the orthant projection move. By setting some subset of vector components to zero, one can generate corresponding points in all orthants, resulting in a family of up to $2^n$ candidate solutions, one in each orthant.

Two properties of the orthant projection move that are important to the present exposition are now noted. First, an orthant projection move preserves $L_p$-norm ball inclusion constraint for all p. Second, under orthant projection moves of x, $\|v-x\|_p$ is minimized when x and v are in the same orthant. Together, these two properties ensure that there is a preferred orthant (determined a priori) where an optimal solution is guaranteed to lie, as long as none of the other constraints are violated.

This observation leads to the following lemma:

Lemma 2. Let x be an optimal solution of Eq. (3),
Then, $x_i v_i \ge 0, \forall i$.

Hence, $x_i$ has the same sign as $v_i$. Note that this lemma holds true for the upper bounded problem as well, since replacing any variable with 0 does not violate this constraint, and hence the proof for the lemma can be applied to the more generic case mentioned above.

The above orthant projection moves also reveal a possible failure mode for the above generalization. If there are terms other than those of the form of $\|v-x\|_p$ and there are constraints other than those of the form of inclusion in $L_p$-norm ball, then a priori preferred orthant selection may not be possible. Preferred orthant selection allows one to simplify the functional form of $L_p$-norm terms. In particular for the $L_1$-norm projection problem, once the problem has been transformed to guarantee that the optimal solution lies in a first orthant, $L_1$-norm constraints become equivalent to the simplex constraints so long as $x_i \ge 0 \forall i$ and $$\sum_{i=1}^n x_i \le z.$$

In order to retain this simplification, any generalization involving terms that are not conducive to an orthant projection move must be explicitly handled. Box constraints are in general not conducive, unless the interval contains the origin. For intervals such as $a_j < 0 < b_j$, the following claim is made:

Claim 3. $|x_i| \in \begin{cases} \{0, |a_i|\} & v_i < 0 \\ \{0, |b_i|\} & v_i > 0 \end{cases}$ Proof: Since $x_i$ has the same sign as $v_i$, a bound (or bound constraint) having a different sign is meaningless and the lower bound can effectively be set at 0. Taking the absolute values of the bound terms leads to Claim 3. Thus, Claim 3 can be used to identify equivalent positive upper bounds.

Based on the above discussions, the generic upper bounded $L_1$-norm projection problem can be written as: given any vector $\hat{v} \in \mathbb{R}^n$, take the absolute value of the elements and transform the vector to, $v \in \mathbb{R}_+^n$, transform the bound constraints to equivalent positive upper bounds, $[a,b] \Rightarrow [0,b]$, based on Claim 3 above, find the projection vector solution x by solving $$\min_x \frac{1}{2}\|x-v\|_2^2 \text{ s.t. } \{x \in \Omega: \|x\|_1 \le z, 0 \preceq x \preceq b\} \quad (13)$$

and return the final projection as $\hat{x}=x\odot\text{sign}(\hat{v})$ (i.e. element-wise multiplication of x by the sign of $\hat{v}$ to effectively move the projection vector solution from an all positive orthant back to include both positive and negative values, as appropriate).

This brings the present discussion to the topic of algorithms.

Identifying simplex projection and $L_1$ projection as the same problem (since the $L_1$ constraint ($|\bar{x}_1|\le z$) and the simplex constraint ($\Sigma x_i \le z$) are the same for positive variables) leads to the study of the problem mentioned above in Eq. (13). In the following sections, three algorithms for the solution of such upper-bounded projection problems are developed. Note that the final sign matching step is assumed implicit in the foregoing sections, and thus is not shown explicitly but should be understood as a final step, if necessary.

The Lagrangian, $L$, for the above optimization problem [Eq. (13)] can be written as $$\mathcal{L} = \frac{1}{2}\|x-v\|_2^2 + \theta\left(\sum_{j=1}^n x_i - z\right) - \zeta \cdot x - \gamma \cdot (b-x) \quad (14)$$

where $\theta \in \mathbb{R}^n$ is a Lagrange multiplier, $\zeta \in \mathbb{R}^n_+$ is a first vector of non-negative Lagrange multipliers, and $\gamma \in \mathbb{R}^n_+$ is a second vector of non-negative Lagrange multipliers.

Differentiating with respect to $x_i$ and comparing to zero gives the first order optimality condition, $$\frac{\partial \mathcal{L}}{\partial x_i} = x_i - v_i + \theta - \zeta_i + \gamma_i = 0 \quad (15)$$

The first complementary slackness KKT condition (as is explained more fully in "Convex Optimization", by Boyd and Vandenberghe, Chapter 5, © Cambridge University Press, 2004, herein incorporated in its entirety by reference) implies that $x=0$, when $v_i+\zeta_i=\theta_i$. Since, $\zeta_i>0$, hence $x_i=0$ whenever $v_i<\theta$.

The second complementary slackness KKT condition implies that $0<x_i<b_i$, means $\zeta_i=0$, $\gamma_i=0$ and $$x_i - v_i + \theta = 0 \quad (16)$$

The above two conditions are also used to arrive at the solution described above in the discussion on Euclidean projection.

The addition of finite upper bounds leads to the next complementary slackness condition: namely that when the value of $x_i$ reaches its maximum value $b_i$, when $\gamma_i>0$ and $$b_i - v_i + \theta + \gamma_i = 0 \quad (17)$$

which leads to the following claim:

$$x_i = b_i \text{ implies } v_1 \ge b_i \quad \text{Claim 4}$$

Proof: Note that both $\theta$ and $\gamma$ are non-negative quantities. Consequently, Eq. (17) is feasible only for $v_i \ge b_i$, because otherwise, no non-negative values of $\theta$ and $\gamma$ can satisfy the complementary slackness condition.

Note that the converse is not generally true, that is, $v_i > b_i$ does not imply that $x_i=b_i$, since it can still be lower than the upper bound. Thus, one can make the following corollary:

Corollary 4. $v_i > b_i$ and $\gamma_i > 0$ implies $x_i = b_i$.

A first algorithm, or method, in accord with the present invention utilizes a "brute-force" approach. It is presently put forth that that one way to solve the optimization problem in Eq. (13) is to find all the $x_i$'s that get fixed at their corresponding upper bound $b_i$'s, remove these variables as well as their contribution from the norm constraint, and then solve the remaining reduced problem using Euclidean projection.

In general, finding the set of $x_i$'s that are fixed at their respective upper bound in the optimal solution can have exponential complexity. Therefore the brute-force approach is further made "greedy", as illustrated in Algorithm 2, below.

The brute-force approach can be better understood with a simplified, two-dimensional example using a single point to be projected, as is shown in FIGS. 5A-5F.

Figure 5A:
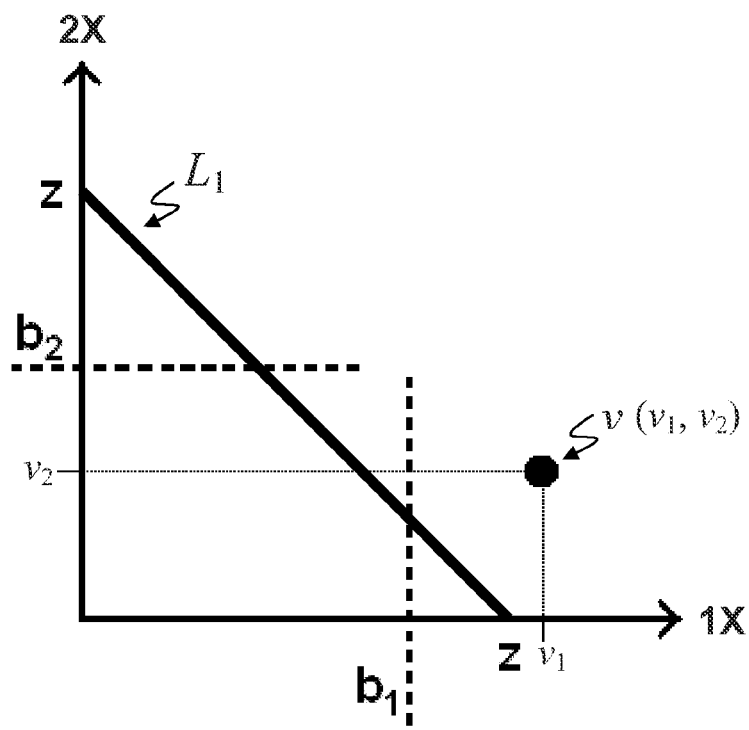
FIGS. 5A-5F illustrate an embodiment of projection onto an $L_1$-norm with box constraints in accord with the present invention.

In FIG. 5A, line z-z defines the $L_1$-norm (within a two-dimensional space defined by dimensions 1× and 2×) onto which a vector is to be projected. For ease of explanation, only one point v (i.e. a 2-dimensional vector) to be projected is shown. Since v is defined by vector elements (i.e. data values, or coordinates) $(v_1,v_2)$ corresponding to the 1× and 2× dimensions, it is hereafter identified as vector v. Dotted line $b_1$ defines the upper bound along the 1× dimension, and dotted line $b_2$ defines the upper bound along the 2× dimension. As shown, upper bounds $b_1$ and $b_2$ traverse the $L_1$-norm (i.e., line z-z).

Figure 5B:
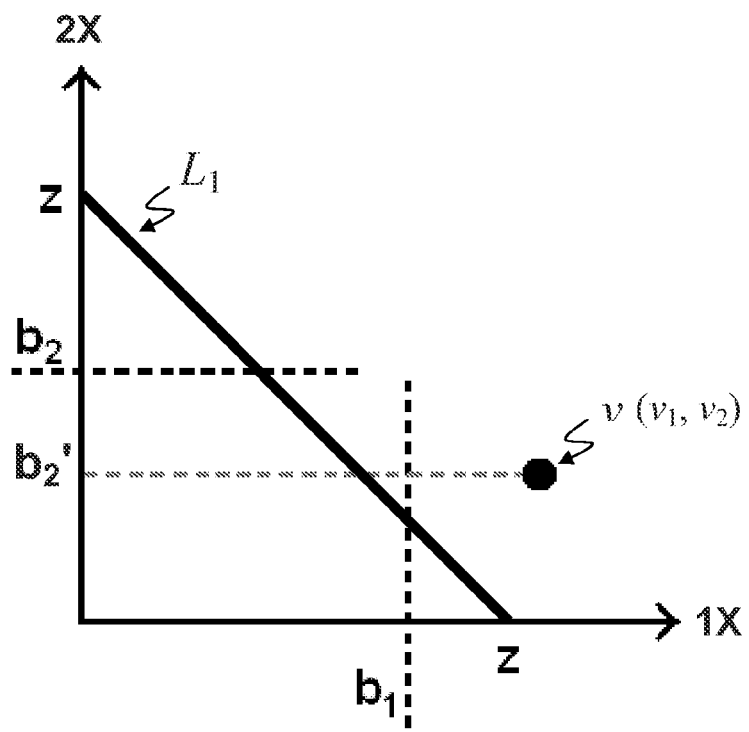

With reference to FIG. 5B, since the $v_2$ value of vector v along the 2× dimension is within upper bound $b_2$, $v_2$ replaces $b_2$ along the 2× dimension and defines a new effective upper bound $b_2'$ (i.e. $b_i^{effective}$, where index i=2), as explained above.

Figure 5C:
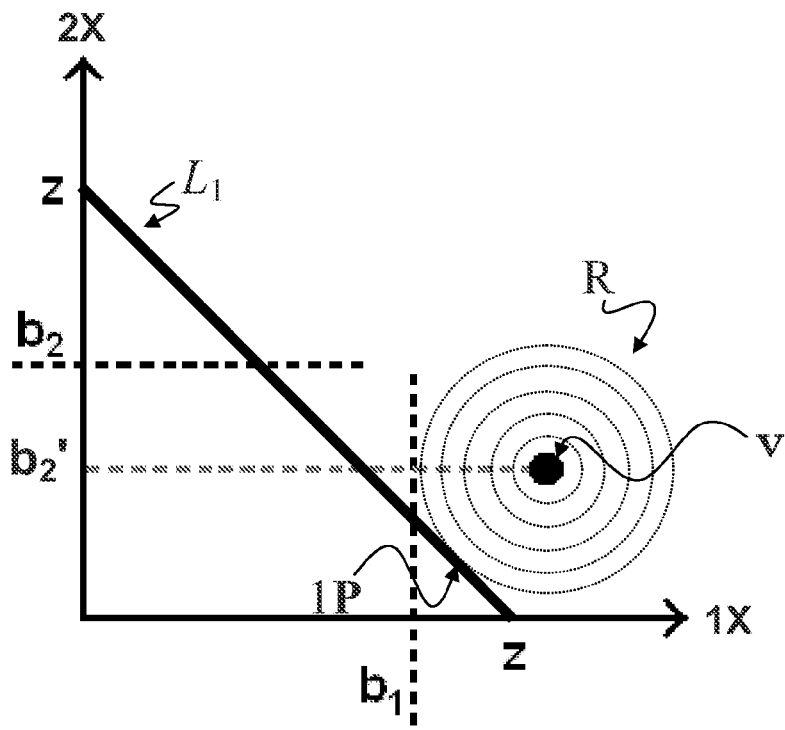

With reference to FIG. 5C, projection of vector v onto the $L_1$-norm is preferably determined by Euclidean projection (i.e. identifying the closes point on line z-z to vector v) to identify a first intermediate projection vector 1P. In the present two-dimensional example, this may be accomplished by extending a circular radius R outward from vector v and identifying the first point of contact with line z-z.

Figure 5D:
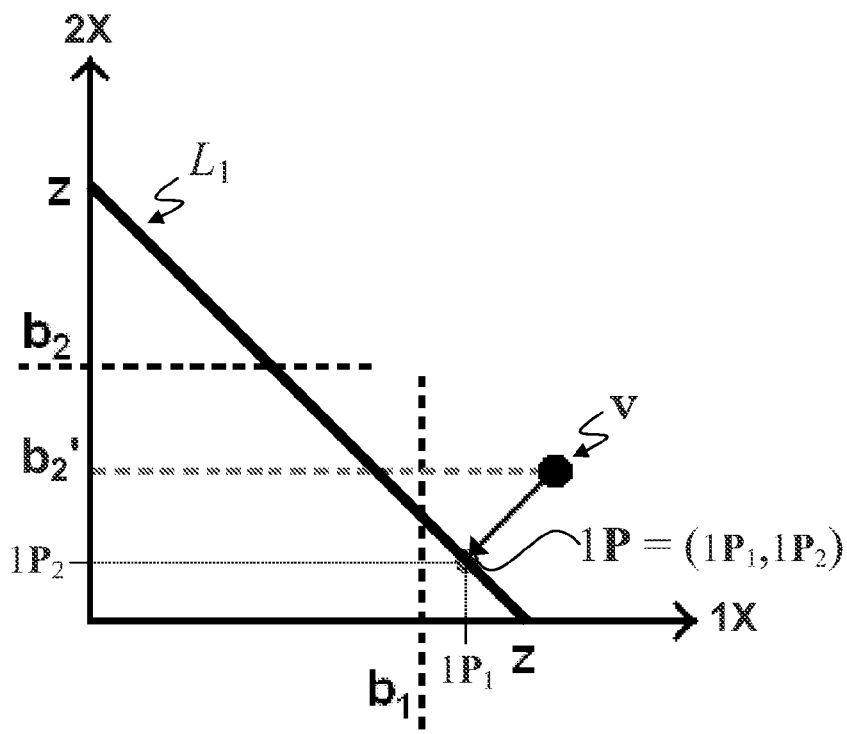

This first point of contact defines first intermediate projection vector 1P, as illustrated in FIG. 5D. The next step is to identify the elements of 1P that are greater than their corresponding element of b. In the present case, element $1P_2$ is within upper bound $b_2'$, but element $1P_1$ is greater than upper bound $b_1$. Thefore, $1P_1$ is not a valid projection solution onto the $L_1$-norm.

Figure 5E:
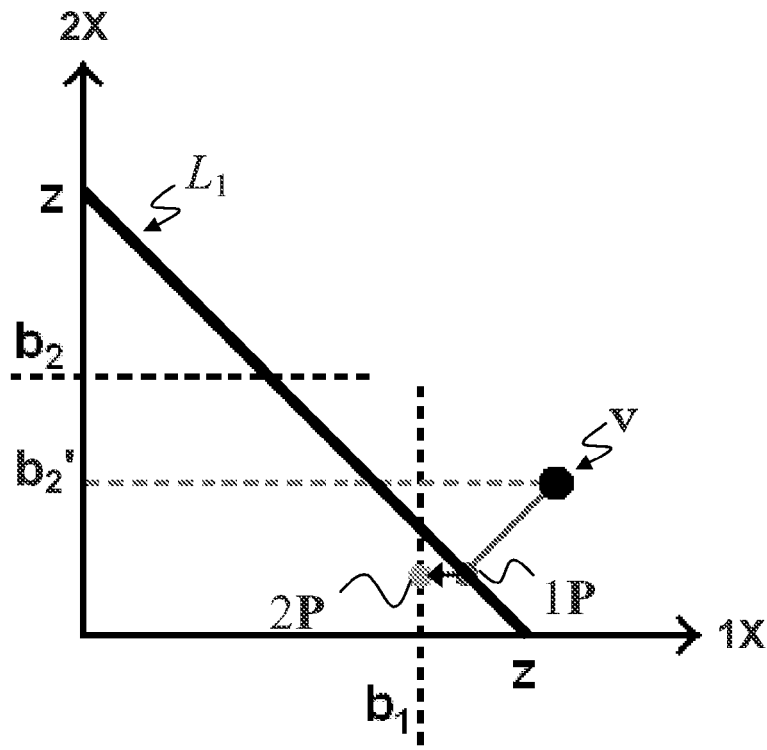

With reference to FIG. 5E, having identified element $1P_1$ as being out of bound, the next step is to move first intermediate projection vector 1P toward upper bound $b_1$, while maintaining it parallel to all other dimensions (i.e. parallel to the horizontal 1× dimension). This may be done by changing element $1P_1$ to match $b_1$ while by keeping all other vector elements of 1P constant. This new point of contact defines a second intermediate projection vector 2P.

Figure 5F:
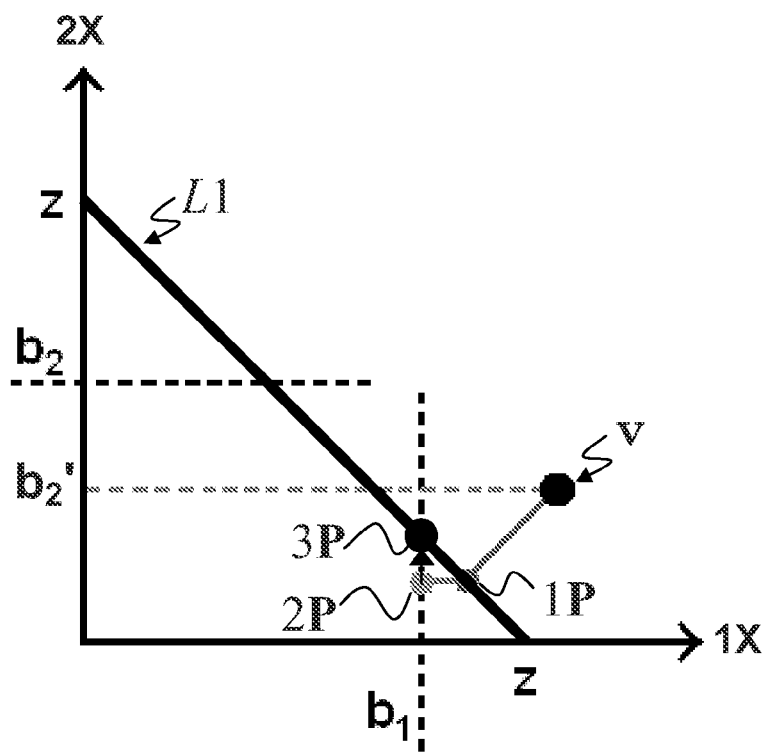

If the current second intermediate projection vector 2P is not on the $L_1$-norm, such as shown in FIG. 5F, the next step is to move toward the $L_1$-norm while maintaining $1P_1$ constant (i.e. maintaining 2P parallel to the 2×-dimension). The point of contact with line z-z defines a third intermediate projection 3P.

Now one can determine if any other elements of 3P are greater than their corresponding upper bound as defined by b, if there were such an output of bond element, then the steps of illustrated in FIGS. 5D to 5F would be repeated for that element. However, since in the present example there are no elements of 3P that are out of bound, 3P is defined as the projection vector solution, i.e. the optimum projection of vector v onto the $L_1$-norm.

The simplified process described in FIGS. 5A-5F is generalized and described in more detail by Algorithm 2, as follows:

---

Algorithm 2, a brute-force algorithm for projection with finite upper bound

---

Require $v \in \mathbb{R}^n$, $z > 0$, upper bound $b \in \mathbb{R}^n$.

$L \leftarrow \{1, 2 \ldots n\}$   // Vector L initially holds a copy of all vector indices of vector v. L identifies the vector elements of v that are processed during each iteration. After each iteration, L is updated to remove from future consideration vector elements of v corresponding to vector components of x (the projection vector solution) that are fixed at their respective upper bound.

$U \leftarrow [\,]$   // U is initially defined as a null set (i.e. has no elements), but after each iteration of the below-defined loop, vector U holds the set of vector indices of x (cumulative with all previous iterations) that are fixed at their respective upper bound Repeat $\bar{z} \leftarrow z - \Sigma_{i:i \in U} b_i$   // Remove from consideration the vector elements that are fixed at their upper bound, as indicated by vector U. During the first iteration, $\bar{z} = z$ since no vector elements have yet been identified as being fixed at their upper bound.

$\bar{v} \leftarrow \{v_i : i \in L\}$   // Populate vector $\bar{v}$ with vector elements ($v_i$) of vector v that are not already fixed at their upper bound, according to the index values i specified by vector L. During the first iteration, $\bar{v} = v$ since L initially holds all indices of v, and no vector elements have yet been identified as being fixed at their respective upper bound.

$\bar{x} \leftarrow$ Euclidean projection of $\bar{v}$ onto z, preferably by applying Algorithm 1 to $\bar{v}, \bar{z}$   // Assume that all current vector elements of $\bar{v}$ and $\bar{z}$ are within their corresponding upper bound $b_i$, as is depicted in FIG. 4a, such that use of Algorithm 1 is appropriate. On each subsequent iteration, the size of vector $\bar{v}$ is reduced by removing the vector elements that correspond to the vector elements of x that were fixed at their respective upper bound during an immediately previous iteration.

$W \leftarrow \{i : \bar{x}_i \geq b_i\}$   // W stores the indices of all vector elements of $\bar{x}$ that are at, or above, their corresponding upper bound within a current iteration, as identified by upper bound vector b. When an iteration is reached when no such elements of $\bar{x}$ are found, the loop will end.

$L \leftarrow L - W$   // Remove from L the vector indices corresponding to vector elements of $\bar{x}$ that are at, or above, their corresponding upper bound, as identified by W $U \leftarrow U \cup W$   // Add to U the vector indices corresponding to vector elements of $\bar{x}$ whose projection values during the current iteration were found to be at, or above, their corresponding upper bound, as identified by W $x[L] \leftarrow \bar{x}[L]$   // Vector x is a projection vector solution that is updated after each iteration. Transfer to $\bar{x}$ the currently updated vector element values of $\bar{x}$ that are within their upper bound, as identified by index vector L.

$x[U] \leftarrow b[U]$   // Transfer to x the upper bound value (b) of vector components determined to be at, or beyond, their upper bound, as identified by index vector U.

Until $W == [\,]$   // Repeat loop until there are no more vector elements of x that need to be fixed at their respective upper bound.

Return x

---

Another algorithm may be developed by noting that the objective function in Eq. (13) can be expanded to $\|v\|_2^2 + \|x\|_2^2 - 2\langle v, x \rangle$. It is further noted that all variable terms are $L_p$-norm terms for various p, except the inner product term and the box-constraints. By rearranging n components of a candidate solution $x \in \mathbb{R}^n$, in general, one can generate a family of up to n! candidate solutions. Two properties of a rearrangement move are now noted. First, a rearrangement move preserves $L_p$-norm for all p. Second, under rearrangement moves of x, inner product $\langle v, x \rangle$ is maximized when x and v correspond to identical permutation of their sorted counterparts, that is, when they have identical inversions i.e. $v_i < v_j \Leftrightarrow x_i < x_j$, for all $\{1 \leq i, j \leq n\}$. This can be proved by re-indexing and invoking rearrangement inequality. It is noted that constraints of the form $(k1 \leq x)$, for some constant k, can also be expressed in terms of $L_\infty$-norm, since $x_i \geq k \forall i \Leftrightarrow \min_i (x_i) \geq k \Leftrightarrow \|x\|_{-\infty} \geq k$. Furthermore, since ordering of components of v determines corresponding ordering of components of x for a viable optimal solution (Algorithm 1, sort statement), a sequence is enforced in which constraints $x_i \geq 0$ can become active for different i. This reduces the number of possible systems of KKT equations from exponential to polynomial, and enables strongly polynomial time solution. Interior point algorithms, on the other hand, can only provide weakly polynomial time solution. Moreover, this sequence can be determined a priori, enabling direct solution for any norm bound z, unlike regularization path based algorithms, which require following the regularization path starting from one end and following all the way to the desired solution.

One important aspect of the cost $\|x - v\|_2^2$ is that the contribution of each $x_i$ to the total cost is dependent on the distance $v_i - x_i$. From this point onwards, it is assumed that upper bound term $b_i = \min(v_i, b_i)$, such that $v_i - b_i \geq 0$. Since each $x_i$ is bounded to being not greater than $b_i$, $(v_i - b_i)$ can be thought to be the relative weight determining the order in which $x_i$'s should be changed to meet the norm constraint. This ordering can also be argued from the fact that the magnitude of the gradient with respect to $x_i$ is determined by the quantity $(v_i - b_i)$.

In Lemma 1, it is shown that even for an upper bounded simplex projection problem (after restriction to first orthant), such constraint ordering is possible for constraints $x_i \geq 0$, and is determined by v. In Lemma 3, below, it is shown that a similar constraint ordering is possible for upper bound constraints $x_i \leq b_i$, and is determined by $(v-b)$. These two constraint orderings are a key contribution and form a basis of a proposed efficient algorithm. Intuitively, v based and $(v-b)$ based constraint orderings can be thought of as being duals of each other. However, there are distinctions. For example, whereas the approach of Algorithm 1 sorts v in descending order, the present approach sorts $(v-b)$ in ascending order.

Based on the above observations, a modified version of lemma 2 is now presented as lemma 3.

Lemma 3: Let x be an optimal solution of Eq. (13). Let i and j be two indices such that $(v_i - b_i) \leq (v_j - b_j)$. If $x_i = b_i$ then $x_j = b_j$ as well.

Proof: From Eq. (17), whenever $x_i = b_i$, then $v_i - b_i = \theta + \gamma_i$ where $\gamma_i > 0$.

Hence $v_i - b_i > \theta$, since $\gamma_i > 0$

-continued $\Rightarrow v_j - b_j \geq v_i - b_i > \theta$ $\Rightarrow v_j - b_j > \theta$ $\Rightarrow v_j - b_j = \theta + \gamma_j$, such that $\gamma_j > 0$ $\Rightarrow x_j = b_j$, from Corollary 4

Lemma 3 asserts that if the non-negative quantities $(v_i - b_i)$'s are sorted in ascending order and x and b are rearranged in the same order to give $\hat{x}$ and $\hat{b}$ respectively, then there exists an index $\rho$ for some $1 \leq \rho \leq n$, beyond which all $\hat{x}_{\rho+k}$ are fixed at their respective upper bounds $\hat{b}_{\rho+k}$. The solution for the elements $\hat{x}_k$ where $k \leq \rho$ are bounded inside the upper bounds and hence constitute a simpler sub-problem. Basically, the range of vector indices k from 0 to $\leq \rho$, define a sub-vector that appears to have no upper bounds, as depicted in FIG. 4A. This simpler sub-problem can be solved using Euclidean projection (i.e. such as Algorithm 1) to generate a partial solution of x for the vector elements identified by vector indices k. Once $\rho$ is determined, all vector elements $\hat{x}_{\rho+k}$ where k>0 can be fixed at their corresponding upper bound value $\hat{b}_{\rho+k}$. Thus, the complete projection vector solution x is comprised of a combination of the partial solution obtained by applying Euclidean projection to vector components $\hat{x}_k$ where $k \leq \rho$, and assigning the upper bound values $\hat{b}_{\rho+k}$ to vector components $\hat{x}_{\rho+k}$ where k>0.

An efficient algorithm (Algorithm 3) is now proposed that performs a binary search for $\rho$ using the ordering of upper bound constraints defined by $(v-b)$.

Algorithm 3 "Algorithm for finding optimum index $\rho$"

| | |
|---|---|
| $\{low, high\} \leftarrow \{1, n\}$ | // variables low and high are used in a binary search for $\rho$ |
| $b \leftarrow \min(b, v)$ | // b is repopulated with $b_i^{effective}$ |
| $w \leftarrow sort(v - b)$ | // ascending order |
| repeat | |
| $mid \leftarrow \left\lceil \frac{low + high}{2} \right\rceil$ | // Variable mid divides the range between low and high into an upper-half and a lower-half, and in each iteration it is used to check if $\rho$ is in the upper-half or lower-half |
| $\bar{z} \leftarrow z - \Sigma_{i:w_i \geq w_{mid}} b_i$ | // Assume that $\rho$ is in the lower-half, and remove from consideration the vector components of z corresponding to the upper-half. |
| $\bar{v} \leftarrow \{v_i : w_i < w_{mid}\}$ | // populate $\bar{v}$ with the vector components of v corresponding to the lower-half |
| $\bar{b} \leftarrow \{b_i : w_i < w_{mid}\}$ | // populate $\bar{b}$ with the vector components of b corresponding to the lower-half |
| $\bar{x} \leftarrow$ Reduced Problem (Euclidean projection of $\bar{v}$ onto $\bar{z}$, preferably by Algorithm 1) | // Apply Algorithm 1 without bound constraints to // reduced vectors $\bar{v}$ and $\bar{z}$ to get $\bar{x}$, then compare // $\bar{x}$ to $\bar{b}$ to check if any $\bar{x}_i$ is out of bounds. If so, // then the Reduced problem is infeasible. |
| if $[(\bar{x}_i \leq \bar{b}_i) \forall i]$ then $\{low, high\} \leftarrow \{mid, high\}$ | // If all elements of $\bar{x}$ are within their perspective upper bound, then $\rho$ is not in the lower-half. Variables low and high are therefore adjusted to search for $\rho$ in the upper-half during the next iteration. |
| else $\{low, high\} \leftarrow \{low, mid\}$ | // If any element of $\bar{x}$ is out of bound, then Euclidian projection is infeasible meaning that $\rho$ is in the lower-half. Variables low and high are therefore adjusted to search for $\rho$ in the lower-half during the next iteration. |

-continued

Algorithm 3 "Algorithm for finding optimum index ρ"

end if
until low ≧ high
ρ ← high

A key idea of this approach is to solve the smaller problem of looking for ρ, and thereby find out which among all indices of x are overshooting their corresponding upper bounds. Once these indices are found, they are fixed at their respective upper bounds. By ordering the variables in increasing order of $(v_i-b_i)$, any $x_i$ getting fixed at its upper bound $b_i$ means that all subsequent indices of x (i.e. have $v_j-b_j > v_i-b_i$) should also be fixed at their respective upper bounds. The remaining indices of x below ρ, which constitute a reduced norm, may then be determined by Euclidean projection, i.e. by unbounded projection.

Figure 6:
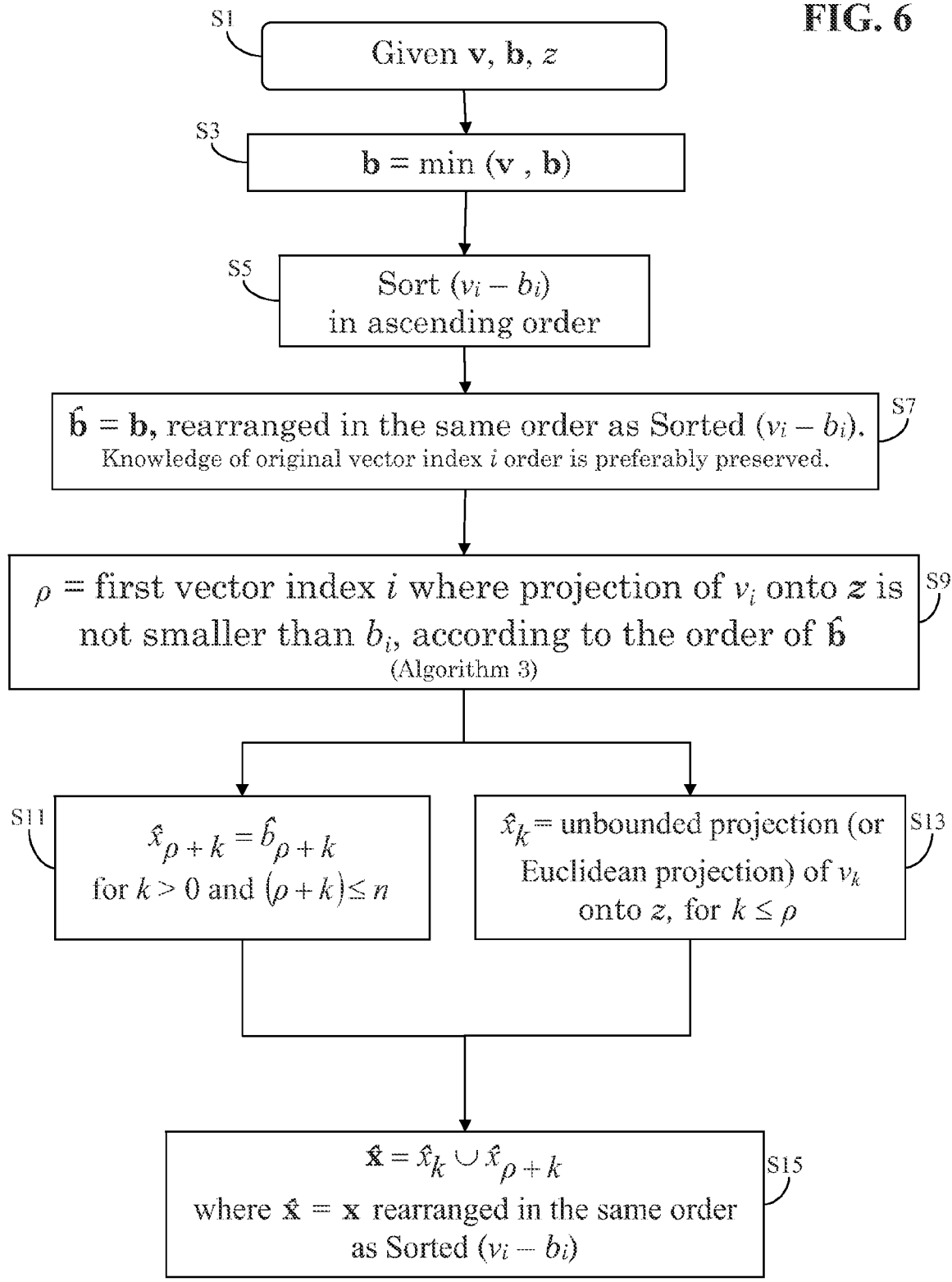
FIG. 6 is a flow chart of an embodiment for of projecting onto an $L_1$-norm with box constraints in accord with the present invention.

This method is summarized in FIG. 6. Given v, b and z, step S1, one may optionally first redefined define b as the smaller of $v_i$ and $b_i$, on an index-by-index basis, step S3. The magnitude $(v_i-b_i)$ is then determined and sorted in ascending order, step S5. Vector b is preferably rearranged in the same order as the sorted magnitudes $(v_i-b_i)$ to create new vector $\hat{b}$, step S7, while preserving knowledge of the original index information of b. One then determines ρ, the first vector index for which projection of $v_i$ onto z is not smaller than $b_i$, according to the order of $\hat{b}$, step S9. Intermediate projection vector solution $\hat{x}$, which has an arrangement order matching $\hat{b}$, is then determined by tying its vector elements from ρ, forward, to their corresponding upper bound as defined by $\hat{b}$, step S11, (i.e. $\hat{x}_{\rho+k}=\hat{b}_{\rho+k}$, for k>0 and (ρ+k)≦n), and calculating vector elements below ρ using Algorithm 1, step S13, (i.e. $\hat{x}_k$=unbounded projection of $v_k$ onto z for k≦ρ). Finally, projection vector solution x is defined as x=$\hat{x}$, step S15, and if desired, x may be rearranged to place it in its original order, according to index i, to undo the order resulting from the sorting of (v−b).

Another, even more efficient algorithm that does not require sorting of vector elements is now proposed. An object of the present algorithm is to provide a strongly linear-time, worst-case complexity, which is the asymptotically fastest possible. To achieve this objective, it will make use of the relation between θ and z along the regularization path, as is explained more fully below.

Above, it was shown that in the optimal projection vector solution: $x_i=0$ whenever $v_i<\theta$; $x_i=b_i$ whenever $v_i-b_i\theta$; and $x_i=(v_i-\theta)$ otherwise. Thus, for any value θ, a projection vector solution x populated with a set of vector elements $x_i$'s can be derived and divided into three disjoint groups, as follows:

$$x_i = \begin{cases} 0 & \text{if } v_i \leq \theta & \text{Fixed at the Lower bound} & \text{group[1]} \\ b_i & \text{if } v_i - b_i \geq \theta & \text{Fixed at the Upper bound} & \text{group[2]} \\ v_i - \theta & \text{if } v_i - b_i < \theta & \text{Contraints inactive(i.e. boundless)} & \text{group[3]} \end{cases}$$

However, since θ is dependent upon the norm z, each derived solution x for each given θ will correspond to projection onto a different z.

In the present case, the problem being addressed is to find the projection vector solution x of a given vector v to a given $L_1$-norm (i.e. a given z) within specified upper bound constraints b. Since the desired z is given, an object of the present approach is to identify the optimal θ that renders the optimal x that is the projection vector solution for the given z. In the following discussion, the given z is identified as $z_{target}$, and the optimal θ that corresponds to $z_{target}$ is identified as θ*. Similarly, the optimal projection vector solution that corresponds to $z_{target}$ is identified as x*. For ease of discussion, non-optimal θ's may be identified as $\theta_{pivot}$ and their corresponding norm as $z_{pivot}$.

Groups [1], [2] and [3] provide a relation between θ and x, but do not provide a relation between θ and z. Thus, they do not provide information for directly identifying the optimal θ* that renders x* that corresponds to $z_{target}$. In order to determine θ*, and thereby determine x*, it is helpful to establish a relation between any θ and its corresponding z. This can be done in terms of the relation between z and x.

Figures 7, 8:
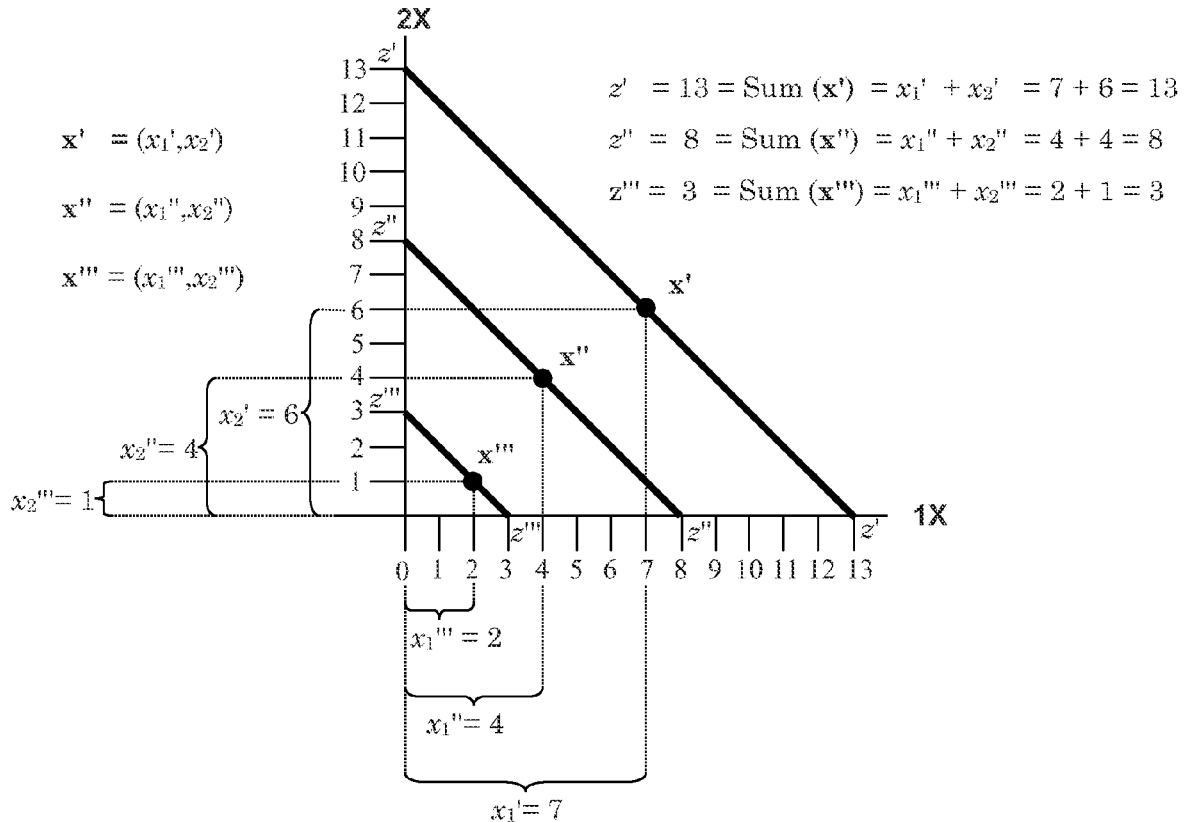
FIG. 7 illustrates a relation between various z's and corresponding x's.
FIG. 8 illustrates the structure of a projection vector solution x in accord with the present invention.

The relation between z and x used in the present embodiment is that z is equal to the sum of all the vector elements of a related x. This can be readily seen by means of a simplified two-dimensional example, as shown in FIG. 7. In this example, three different $L_1$-norm's, denoted z', z" and z''', have values of 13, 8 and 3, respectively, are shown, each with a corresponding projection vector solution x', x", and x'''. For example, x' is defined by vector elements ($x_1'$,$x_2'$) whose values (7,6) sum up to z'=13. Similarly, x" is defined by vector elements ($x_1''$,$x_2''$) whose values (4,4) sum up to z"=8, and x''' is defined by vector elements ($x_1'''$,$x_2'''$) whose values (2,1) sum up to z'''=3. It is further noted that any projection vector solution along the same z will sum up to z. This relationship may be defined as:

$$z = \sum_{i=1}^{n} x_i$$

With reference to FIG. 8, each possible solution x includes n vector elements, each identified by a corresponding index i, where i varies from 1 to n. As explained above, each of x's vector elements may be categorized as belonging to one of three groups: group [1] is comprised of vector elements fixed at their lower bound (i.e. 0) and illustratively identified by an "L"; group [2] is comprised of vector elements fixed at their corresponding upper bound $b_i$ and illustratively identified by a "U"; or group [3] comprised of vector elements having unbounded projection (i.e. constraint inactive and/or Euclidean projection) onto the norm and illustratively identified by a "C".

For ease of explanation, the indices identifying all the vector elements that are lower bounded (i.e. those in group [1]) can be grouped into an index set L. Similarly, the indices of the upper bounded vector elements (i.e. those in group [2]) can be grouped into a second index set U, and the remaining indices (i.e. vector elements in group [3]) can form a third index set C. In the discussion below, the index sets of the optimal solution x* corresponding to the optimal θ* are denoted as L*, U* and C*.

The sum of all elements of x can therefore by obtained by determining a sub-total of vector elements for each of the three groups [1], [2] and [3], and then summing the three sub-totals [i.e. sum (x)=sum(L)+sum(U)+sum(C)]. This may be expressed as:

$$\sum_{i=1}^{n} x_i = \sum_{i \in L} \text{lower\_bound}_i + \sum_{i \in U} b_i + \sum_{i \in C} (v_i - \theta)$$

Since in the presently preferred embodiment, the bound constraints are transformed to equivalent all positive upper bounds such that the transformed lower bounds are fixed at 0, the relation between z and x may be expressed as:

$$z = \sum_{i=1}^{n} x_i \qquad (18)$$
$$= \sum_{i \in U} b_i + \sum_{i \in C} (v_i - \theta)$$
$$z = \sum_{i \in U} b_i + \sum_{i \in C} v_i - \|C\|\theta$$

where $\|.\|$ for a set argument denotes its cardinality (i.e. its total number of elements). Therefore, for any $\theta_{pivot}$ it is possible to determine its corresponding $z_{pivot}$, and if its corresponding $z_{pivot}$ matches $z_{target}$, then $\theta^*$ has been identified. The identified $\theta^*$ can then be used to render the optimal vector projection solution $x^*$.

However, since the summations in eq. (18) involve O(n) summation terms at every iteration of $\theta$, they result in O(n log n) complexity. Consequently, using eq. (18) to evaluate $z_{pivot}$ at pivot $\theta_{pivot}$ is not an optimal approach if one is to achieve overall linear-time, worst-case complexity.

To achieve an overall linear-time complexity, it is beneficial to rewrite eq. (18) in terms of partial sums. Let Sum_all ($v_i$) be the sum of all $v_i$, let Sum_L($v_i$) be the sum of the $v_i$ whose index i is in index set L, let Sum_U($v_i$) be the sum of the $v_i$ whose index i is in index set U, let Sum_U($b_i$) be the sum of the $b_i$ whose index i is in index set U, let $n_L$ be the number of elements in index set L, and let $n_U$ be the number of elements in index set U. Using this notation, eq. (18) may be rewritten as:

$$z = \text{Sum\_U}(b_i) + [\text{Sum\_all}(v_i) - \text{Sum\_L}(v_i) - \text{Sum\_U}(v_i)] - [n - n_L - n_U]\theta \qquad (19)$$

For the $z_{target}$ that corresponds to the optimal $\theta^*$, this may be expressed as:

$$z_{target} = \text{Sum\_U}^*(b_i) + [\text{Sum\_all}(v_i) - \text{Sum\_L}^*(v_i) - \text{Sum\_U}^*(v_i)] - [n - n_L^* - n_U^*]\theta^*$$

The following provides an iterative method of finding $\theta^*$ based on the principle of equation (19), by updating $\theta_{pivot}$ at each iteration so as to approach $\theta^*$.

From Eq. (18), it is evident that z is a monotonically decreasing piece-wise linear function of $\theta$, with 2n points of discontinuity at $v_i$ and $(v_i - b_i)$ values. Therefore, $\theta^*$ may be determined from the 2n elements comprised from the merging of vectors v and (v−b). For ease of manipulations, a new vector, vvb, of 2n elements is created by merging together vectors v and (v−b). At each iteration, a new $\theta_{pivot}$ is calculated from an interval of vvb (i.e. an "uncertainty interval") defined by left and right vector element pointers, $\theta_L$ and $\theta_R$, of vvb. With each iteration, at least one of $\theta_L$ or $\theta_R$ is updated to reduce the span of the uncertainty interval from which the next $\theta_{pivot}$ in the next iteration is to be determined. Additionally, each updated $\theta_L$ is selected such that any $v_i \leq \theta_L$ will also be $v_i \leq \theta^*$, and thus be fixed at its lower bound in the optimal solution $\theta^*$. Similarly, each updated $\theta_R$ is selected such that any $(v_i - b_i) \geq \theta_R$ will also be $(v_i - b_i) \geq \theta^*$, and thus be fixed at its upper bound in the optimal solution $\theta^*$.

In order to make use of the available vector elements in vvb, eq. (19) may be further modified to be written in terms of v and (v−b). Additionally, since $\theta_{pivot}$ is updated to approach $\theta^*$ at each iteration, the vector elements within each newly defined uncertainty interval are rechecked and reassigned to appropriate groups [1], [2] or [3], such that with each iteration index sets L and/or U and the sum of $\|C\|\theta$ are updated. Therefore a running tally of affected quantities is maintained.

An equation for obtaining an updated value of $z_{pivot}$ at each iteration of $\theta_{pivot}$ is as follows.

First, the sum of all $v_i$ is obtained as $$S_{all} = \sum_{i=1}^{n} v_i.$$

Secondly, two running partial sums, $S_L$ and $S_R$, are maintained across all iterations, where:

$S_L$=sum of $v_i$ for all elements that are guaranteed to be set to zero in the optimal solution, i.e. $v_i \leq \theta_L \Rightarrow i \in L^*$.

$S_R$=sum of $(v_i - b_i)$ for all elements that are guaranteed to be set to corresponding upper bounds in the optimal solution, i.e. $(v_i - b_i) \geq \theta_R \Rightarrow i \in U^*$ Cardinality $n_L$ and $n_R$ of these sets is also maintained. Eq. (19) can be expressed as $$z_{pivot} = \left( \sum_{i: \theta_{pivot} \leq (v_i - b_i) < \theta_R} b_i \right) +$$
$$\left( (S_{all} - S_L - S_R) - \left( \sum_{i: \theta_L < v_i \leq \theta_{pivot}} v_i \right) - \left( \sum_{i: \theta_{pivot} \leq (v_i - b_i) < \theta_R} v_i \right) \right) -$$
$$\left( ((n - n_L - n_R)\theta_{pivot}) - \left( \sum_{i: \theta_L < v_i \leq \theta_{pivot}} \theta_{pivot} \right) - \left( \sum_{i: \theta_{pivot} \leq (v_i - b_i) < \theta_R} \theta_{pivot} \right) \right)$$

Rewriting this partial sum equation in more concise form, one obtains:

$$z_{pivot} = (S_{all} - S_L - S_R) - (n - n_L - n_R)\theta_{pivot} - \qquad (20)$$
$$\left( \sum_{i: \theta_{pivot} \leq (v_i - b_i) < \theta_R} (v_i - b_i - \theta_{pivot}) \right) - \left( \sum_{i: \theta_L < v_i \leq \theta_{pivot}} (v_i - \theta_{pivot}) \right)$$

A method for determining $\theta^*$ is summarized in FIG. 9, and described in more detail in the pseudo code of Algorithm 4, below.

Figure 9:
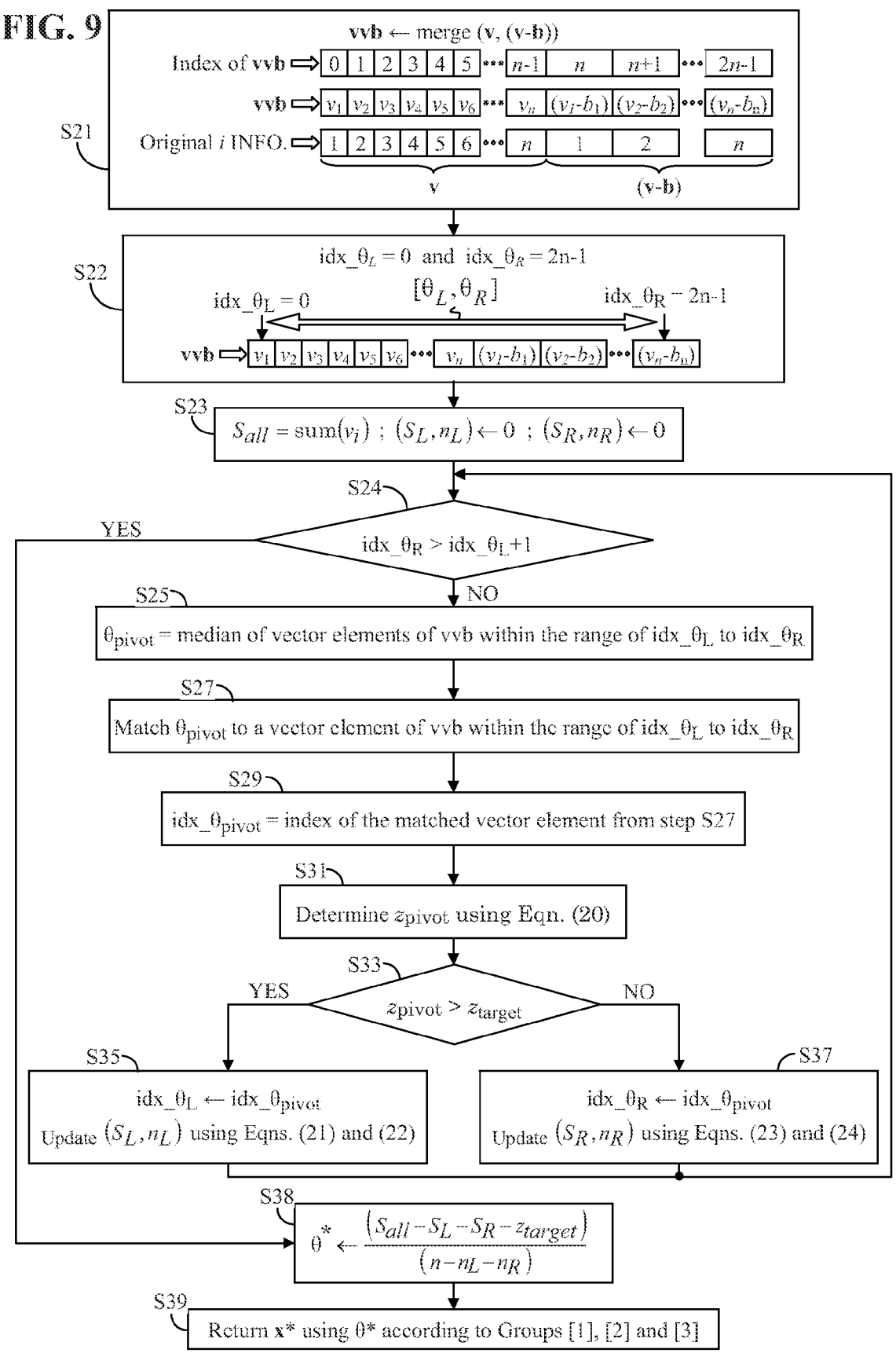
FIG. 9 is a flow chart for projecting onto an $L_1$-norm with box constraints in accord with the present invention.

With reference to FIG. 9, vector vvb is defined by merging together (preferably by concatenating) vectors v and (v−b), step S21. Vector vvb is indexed from 0 to (2n−1), but the original index i information of vectors v and (v−b) is preferably preserved.

Several variable memory spaces may now be initialized. The present embodiment searches for $\theta^*$ within an "uncertainty interval" $[\theta_L, \theta_R]$ of vvb defined as ranging form a left index position of vvb (idx_$\theta_L$) to a right index position of vvb (idx_$\theta_R$). By updating index positions idx_$\theta_L$ and idx_$\theta_R$, the span of uncertainty interval $[\theta_L, \theta_R]$ is also updated. In step S22, index position idx_$\theta_L$ and idx_$\theta_R$ are initially set at the extreme ends of vvb so that uncertainty interval [$\theta_L$, $\theta_R$] initially spans the entirety of vvb [i.e., idx_$\theta_L$=0 and idx_$\theta_R$= (2n−1)]. Index positions idx_$\theta_L$ and idx_$\theta_R$ are moved closer in each subsequent iteration such that the span of uncertainty interval [$\theta_L$, $\theta_R$] around $\theta^*$ is reduced.

In step S23, variable $S_{all}$ is assigned the sum of all $v_i$. Additionally, index sets $S_L$ and $S_R$ are initialize to zero, and consequently their cardinality variables $n_L$ and $n_R$ are likewise set to zero.

Steps S25-S37 are repeated until an iteration is reached where vvb indices idx_$\theta_L$ and idx_$\theta_R$ meet or cross, as determined by step S24.

Variable $\theta_{pivot}$ hold the current working value of $\theta$ during each iteration. In step S25, $\theta_{pivot}$ is set to the median of the vector elements within the current uncertainty interval of vvb (i.e. from idx_$\theta_L$ to idx_$\theta_R$). In Step S27, $\theta_{pivot}$ is matched to a vector element within the current uncertainty interval. The index of the matched vector element is then stored as idx_$\theta_{pivot}$ in step S29.

Next, Step S31 calculates $z_{pivot}$ from the current $\theta_{pivot}$ value. Preferably this is achieved by application of eq. (20). If $z_{pivot}$ were to match $z_{target}$, then the current $\theta_{pivot}$ would be the optimal $\theta^*$, which would lead to the optimal projection vector solution $x^*$. However, since idx_$\theta_L$ and idx_$\theta_R$ have not converged, as determined in step S24, it is evident that the current $z_{pivot}$ is not the optimal z. Thus, the next step is to determine how to update idx_$\theta_L$ and idx_$\theta_R$ so as to narrow the uncertainty interval around $\theta^*$. This is done by determining if $\theta^*$ is likely to be determine from vector elements to the right or to the left of idx_$\theta_{pivot}$. This is done in step S33 by comparing $z_{pivot}$ to $z_{target}$.

If $z_{pivot}$ is greater than $z_{target}$, then the vector elements of vvb to the right of index position idx_$\theta_{pivot}$ should be used to calculate the next $\theta_{pivot}$ in the next iteration. Thus, the left index pointer idx_$\theta_L$ is moved to position idx_$\theta_{pivot}$, as illustrated in step S35. Also in this step, index set $S_L$ and its cardinality variables $n_L$ are updated as follows:

If $z_{pivot} > z_{target}$, [($\theta_{pivot}$, $\theta_R$] becomes new uncertainty interval, and $S_L$ and $n_L$ are updated as $$S_L \leftarrow S_L + \sum_{i:\theta_L < v_i \leq \theta_{pivot}} v_i \qquad (21)$$

$$n_L \leftarrow n_L + \sum_{i:\theta_L < v_i \leq \theta_{pivot}} 1 \qquad (22)$$

On the other hand, if $z_{pivot}$ is not greater than $z_{target}$, then vector elements of vvb to the left of index position idx_$\theta_{pivot}$ should be used to calculate the next $\theta_{pivot}$ in the next iteration, and the right index pointer idx_$\theta_R$ is moved to position idx_$\theta_{pivot}$, as illustrated in step S37. Also in this step, index set $S_R$ and its cardinality variables $n_R$ are updated, as follows.

If $z_{pivot} < z_{target}$, [$\theta_L$, $\theta_{pivot}$] becomes new uncertainty interval, and $S_R$, and $n_R$ are updated as $$S_R \leftarrow S_R + \sum_{i:\theta_{pivot} \leq v_i - b_i < \theta_R} (v_i - b_i) \qquad (23)$$

$$n_R \leftarrow n_R + \sum_{i:\theta_{pivot} \leq v_i - b_i < \theta_R} 1 \qquad (24)$$

Looping back to step S24, if it now determined that index pointers idx_$\theta_L$ and idx_$\theta_R$ meet, then process flow continues to step S38, and optimal $\theta^*$ is calculated. From eq. (18), we have $$\theta^* = \frac{\sum_{i \in U^*} b_i + \sum_{i \in C^*} v_i - z_{target}}{\|C^*\|} \qquad (25)$$

In terms of partial sums using $z_{target}$, $S_{all}$, and the latest updates of $S_L$, $S_R$, $n_L$ and $n_R$ $\theta^*$ may be calculated as:

$$\theta^* \leftarrow \frac{(S_{all} - S_L - S_R - z_{target})}{(n - n_L - n_R)}$$

With $\theta^*$ determined, the step S39 determines $x^*$ using $\theta^*$ and the grouping information of groups [1], [2] and [3].

This process is described in more detail in Algorithm 4.

As explained above, Algorithm 4 operates upon merged v and (v−b) arrays, maintaining source information (i.e. original index information). In the first stage, one finds the linear segment corresponding to a given z. Uncertainty interval [$\theta_L$, $\theta_R$] for $\theta_{pivot}$ is initialized with [0, 2n−1], or with [min(v−b), max(v)], and is reduced in every subsequently iteration by bisection at a pivot selected from the elements of merged v and (v−b) arrays lying in the current uncertainty interval. For the $\theta_{pivot}$, it is presently preferred that the median be used as the pivot, which may be found using a worst case linear time median finding algorithm, as it is known in the art, in order to ensure that the number of iterations remains O(log n) and that after every iteration, the size of the uncertainty interval reduces by a constant fraction. Iterations continue until there are no more points of discontinuity in the uncertainty interval and L*, U* and C* have been found. $\theta^*$ is then evaluated using eq. (25).

---

Algorithm 4 "Algorithm for worst case strongly linear time projection onto the simplex with finite upper bound"

---

Require: v ∈ ℝ$^n$, b ∈ ℝ$^n$, 0 < $z_{target}$ < $\Sigma_{i=1}^n b_i$
vvb ← merge(v, (v − b))   //maintain source info
(idx_$\theta_L$, idx_$\theta_R$) ← (0, 2n −1)
$S_{all}$ ← sum(v)
($n_L$, $S_L$) ← 0
($n_R$, $S_R$) ← 0
while idx_$\theta_R$ > idx_$\theta_L$ + 1 do
  $\theta_{pivot}$ ← pivot_select(vvb, idx_$\theta_L$, idx_$\theta_R$)
  partition(vvb, idx_$\theta_L$, idx_$\theta_R$, $\theta_{pivot}$)
  idx_$\theta_{pivot}$ ← index ($\theta_{pivot}$)
  Evaluate $z_{pivot}$ using (20)
  if $z_{pivot}$ > $z_{target}$ then
    idx_$\theta_L$ ← idx_$\theta_{pivot}$
    Update ($n_L$, $S_L$) using (21) and (22)
  else
    idx_$\theta_R$ ← idx_$\theta_{pivot}$
    Update ($n_R$, $S_R$) using (23) and (24)
  end if
end while
$\theta^*$ ← ($S_{all}$ − $S_L$ − $S_R$ − $z_{target}$)/ (n − $n_L$ − $n_R$)
Return x corresponding to $\theta^*$

---

Experimental results using Algorithm 4 are now presented, first applied to a synthetic data, and then applied to a real-world scenario.

For the first experiment using synthetic data, labeled data belonging to two classes (class 1 and class 0) was generated such that the probability of a label being in class 1 or class 0 is distributed according to logistic likelihood $p(y_i=1|x_i, w)=\sigma(w.x_i)$, where $\sigma(a)=1/(1+\exp(-a))$. Additionally, 10% of the data labels are disturbed by introducing false labels based on random draws. The ground truth parameter vector w is generated from a generalized Gaussian distribution, with rejection, such that the individual elements of the vector are bounded within ±0.5. The inference problem is thus an estimation problem with known upper bounds. The average logistic log loss is minimized, and projects the gradient vector to the convex space. The norm constraint is determined as a fixed fraction of the dimension of the vector.

Figure 10A:
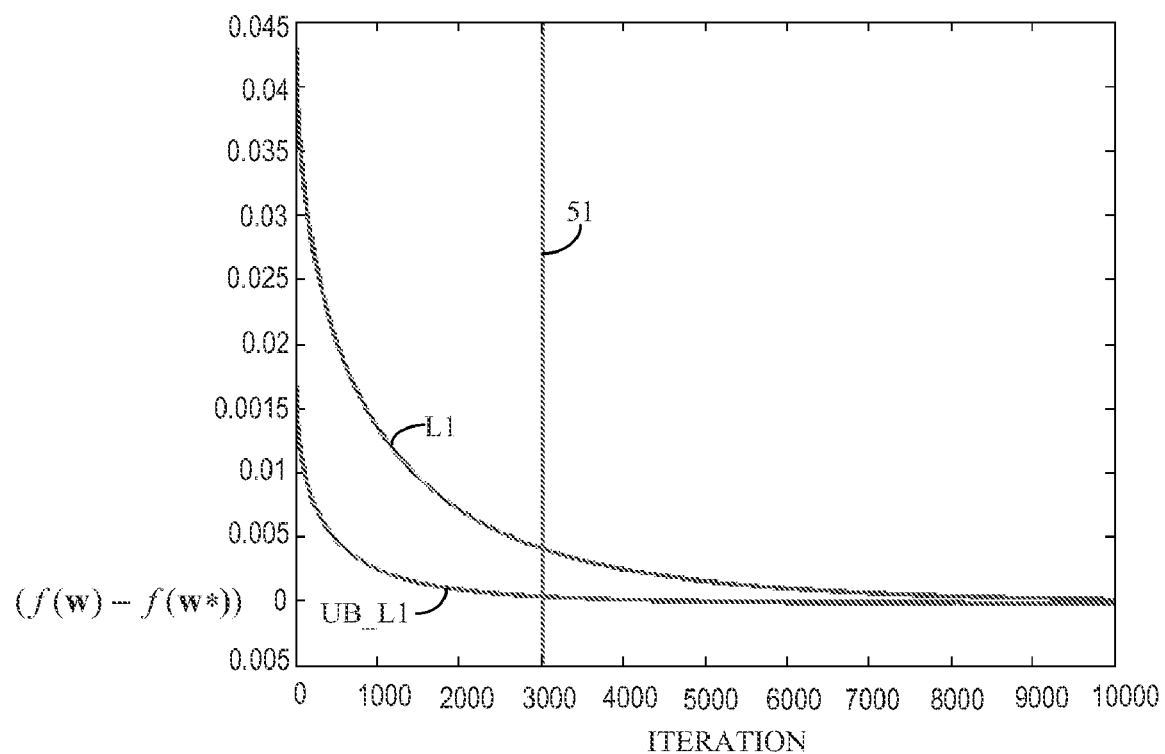
FIG. 10A illustrates experimental results comparing the prior art L1 method to the upper-bounded method of the present invention.

The estimation error against the iterations, where the error is denoted as $f(w)-f(w^*)$ is shown in FIG. 10A. The prior art method is labeled L1, and the present upper-bounded method is identified as UB_L1. The plot shows the absolute value of $(f(w)-f(w^*))$ versus iteration count.

Figure 10B:
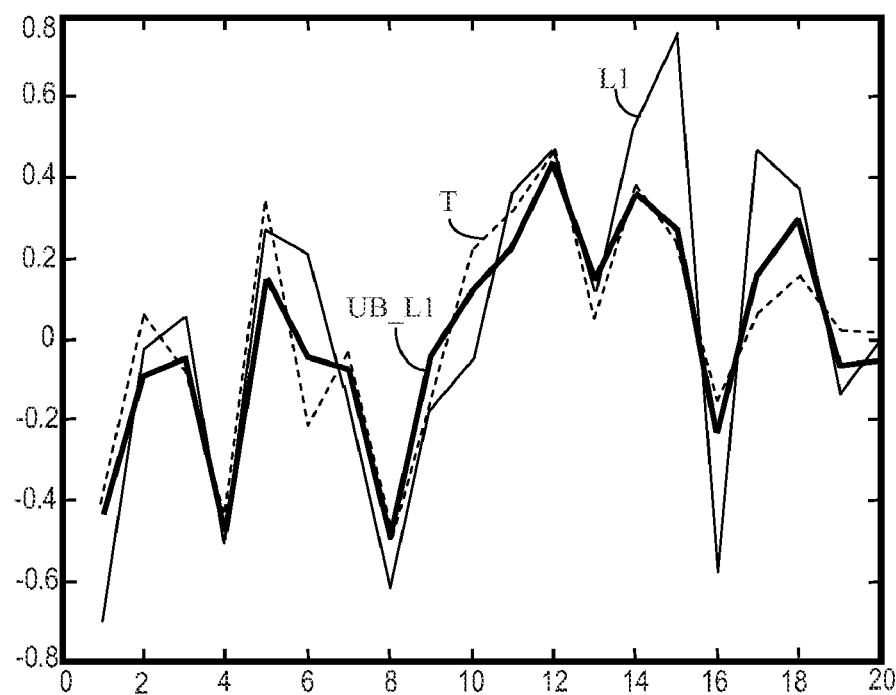
FIG. 10B illustrates a close-up of the parameter estimate of a sub-optimal location from FIG. 10A.

The vertical line, 51, identifies an intermediate point, and a close-up of the parameter estimate of this sub-optimal location is shown in FIG. 10B. For comparison purposes, the ground truth line T (i.e. the truth parameter vector) is also shown in FIG. 10B. As illustrated, the L1 method routinely overshoots and undershoots the ground truth line T by a greater amount than present upper-bounded method, UB_L1.

Thus as shown in FIG. 10a, the present UB_L1 approach converges toward the ground truth parameter vector more quickly than the prior art L1 method. However, at convergence, both methods estimate the ground truth parameter vector very closely. A close-up of where both methods have converged to the truth parameter vector is shown in FIG. 10C.

Next, the run time performance of algorithm 4 is compared with the run time performance of a standard quadratic programming (QP) implementation in MATLAB®. The results of this comparison are shown in FIGS. 11A and 11B. The horizontal axis runs over the dimension of the input vector.

FIG. 11A shows the run time (in seconds) for QP implementation of MATLAB®, and the run time (also in seconds) for the linear time (LT) method of Algorithm 4. The horizontal axis runs over the dimension of the input vector v.

FIG. 11B provides a zoomed-in view of the linear time (LT) of algorithm 4. As shown, the method of algorithm 4 takes about 0.22 seconds to project dense vectors with 1 million non-zero elements.

The next experiment is drawn from a real world scenario that motivates the use of upper bound constraints. This scenario is drawn from a problem of food distribution, which is easily applied to the present case. Suppose the production of a food item (for example, chicken) in 40 states in the US is provided as an initial vector v. Assume that r % of the total production is put up for sales, and one wishes to predict the sales vector, x, for the 40 states. The upper bounds for each element entry in the sales vector x (i.e. sales number for each of the 40 states) can be obtained from consumption patterns from previous years.

In order to compare the predicted sales vector x with a true sales vector, the present example will attempt to predict a sales vector for the year 2007 using consumption data from the year 2004. Thus, chicken production data in 2007 becomes the new production vector v, and chicken distribution data from 2004 for the forty states establishes the upper bound vector b. To remove scale differences, the upper bound vector b is normalized such that the norm (b)=norm (v). The norm constraint z is designed to be norm (v)*r/100.

Figure 12:
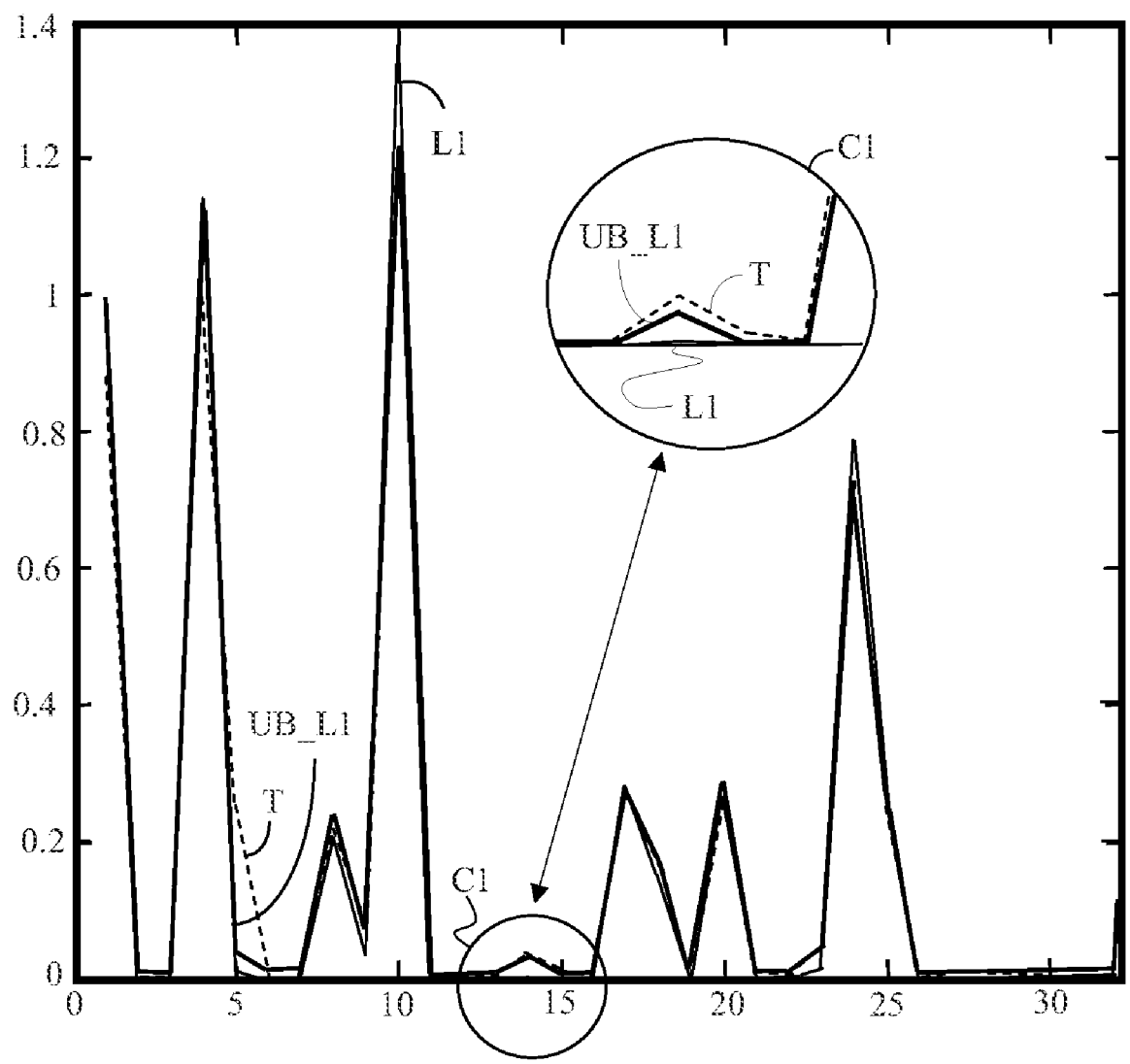
FIG. 12 compares the results of applying the prior art L1 method and the upper-bounded method of the present invention to a real world scenario experiment for estimating chicken sales in 40 states in 2007.

The results for this real-world scenario experiment are shown in FIG. 12, where predictions using the prior art unbounded method (L1) and using the present upper-bounded method (UB_L1) are compared to the true sales data T (i.e. the actual sales of chicken in 40 states in 2007). As the value of the norm constraint z decreases, L1 forces more and more mass into the dominant elements. By contrast, the method of the present invention still tries to satisfy the upper bound constraints, even as the norm constraint z decreases, which spreads the distribution at the cost of sparsity. As the supply decreases, the L1 method tries to bias the distributions among the states based on the relative weights of the production itself. The method of the present invention, on the other hand, applies the demand based upper bounds, and biases the distribution in favor of the states with maximum disparity between production and supply. Thus, it is noted (by providing an enlarged view of a small region identified by circle C1) that the L1 method completely misses sales data for region C1 whereas the method of the present invention still provides some value to it.

The key insight obtained from the above experiments is that $L_1$ tries to increase the dominant elements while putting zeroes for all the others. By contrast, the present invention's bound-constrained $L_1$, weighs the elements based on their distance from their corresponding bound. This case leads to better predictions, specifically in cases that should be weighed based on the disparity between demand and supply. The elements with higher disparity get higher weight in the predicted distribution vector.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A computer implemented method for $L_1$ constraint optimization under box constraints, comprising:
   providing a data processing device to implement the following steps:
   (I) accessing a vector v' to be projected onto an $L_1$-norm of value z, where $v' \in \mathbb{R}^n$;
   (II) taking the absolute value of the elements of v' to create a transformed vector v, where $v \in \mathbb{R}^n_+$;
   (III) accessing bound constraints [a,b], where [a] is a vector of lower bound constraints and [b] is a vector of upper bound constraints;
   (IV) transforming bound constraints [a,b] to [0,b] by identifying equivalent positive upper bounds;
   (V) identifying a projection vector solution, x, as the projection of vector v onto the $L_1$-norm as limited by upper bounds b; and
   (VI) defining a projection vector solution x' by performing element-wise multiplication of x by the sign of v' according to $x'=x \odot \text{sign}(v')$.

2. The method of claim 1, wherein step (III) further includes redefining b as $b \leftarrow \min(b, v)$.

3. The method of claim 1, wherein projection vector solution x is defined as $$\min_x \frac{1}{2}\|x-v\|_2^2$$

such that $\{x \in \Omega : \|x\|_1 \leq z, 0 \preccurlyeq x \preccurlyeq b\}$, where a non-empty set $\Omega$ signifies the existence of a solution, $0 \in \mathbb{R}^n$ is a vector of all zeros, $b \in \mathbb{R}_+^n$; and notation $(p \preccurlyeq q)$ denotes that $p_i \leq q_i$, $\forall i \in \{1, n\}$.

4. The method of claim 3, wherein elements $\alpha$ of $\Omega$ are defined as $\alpha \in \Omega$ where $|\alpha|_1 \leq z$ and $0 \leq \alpha \leq b$.

5. The method of claim 1, wherein step (V) includes the following sub-steps:
   (a) identifying a first intermediate projection vector as the unbounded projection of vector v onto the $L_1$-norm;
   (b) IF there is an element of the intermediate projection vector that is larger than its corresponding upper bound as defined in b,
      THEN fixing said element of the intermediate projection vector at its corresponding upper bound as defined b, and
      IF the intermediate projection vector is not on the $L_1$-norm,
         THEN moving the intermediate projection vector to the $L_1$-norm while maintaining constant all elements of the intermediate projection vector previously fixed at their corresponding upper bound, and returning to the start of step (b),
      ELSE returning to start of step (b);
   (c) defining the intermediate projection vector as the projection vector solution x.

6. The method of claim 5, wherein in sub-step (a), the unbounded projection of vector v onto the $L_1$-norm is by Euclidean projection.

7. The method of claim 1, wherein step (V) includes the following sub-steps:
   (a) defining a memory space $L \leftarrow \{1, 2 \ldots n\}$;
   (b) defining a memory space $U \leftarrow [\ ]$, where $[\ ]$ denotes a null set with no elements;
   (d) defining a memory space $\bar{z} \leftarrow (z - \Sigma_{i:i \in U} b_i)$;
   (e) defining a memory space $\bar{v} \leftarrow \{v_i : i \in L\}$;
   (f) defining an intermediate projection vector $\bar{x}$ as the unbounded Euclidean projection of vector $\bar{v}$ onto $\bar{z}$;
   (g) defining a memory space $W \leftarrow \{i : \bar{x}_i \geq b_i\}$;
   (h) updating L as $L \leftarrow L - W$;
   (i) updating U as $U \leftarrow U \cup W$;
   (j) updating $x[L]$ as $x[L] \leftarrow \bar{x}[L]$;
   (k) updating $x[U]$ as $x[U] \leftarrow b[U]$;
   (l) if $W == [\ ]$, then return to step (d); and
   (m) return projection vector solution x.

8. The method of claim 7, wherein the unbounded Euclidean projection of vector $\bar{v}$ onto $\bar{z}$ is defined as:
   sorting $\bar{v}$ into a memory space $\mu$, where $\mu_1 \geq \mu_2 \geq \ldots \geq \mu_L$;
   finding $$\tau = \max\left(j \in [L] : \mu j - \frac{1}{j}\left(\sum_{r=1}^{j} \mu_r - \bar{z}\right) > 0\right),$$

where [L] denotes the set of integers 1 to L;
defining $$\theta = \frac{1}{\tau}\left(\sum_{r=1}^{\tau} \mu_r - \bar{z}\right);$$

and
   defining intermediate projection vector $\bar{x}$ as $\bar{x}_i = \max\{(\bar{v}_i - \theta), 0\}$.

9. The method of claim 1, wherein step (V) includes the following sub-steps:
   (a) sorting quantities $(v_i - b_i)$'s in ascending order, and arranging x and b in the same order to define $\hat{x}$ and $\hat{b}$ respectively;
   (b) determining an index $\rho$ where $1 \leq \rho \leq n$ and all $\hat{x}_{\rho+k}$ are fixed at their respective upper bound $\hat{b}_{\rho+k}$ for a positive value of k;
   (c) defining elements $\hat{x}_k$ where k are vector indices ranging from 0 to $\leq \rho$, as the solution of unbounded Euclidean projection of $v_k$ onto z;
   (d) defining elements $\hat{x}_{\rho+k}$, where $k > 0$ and $(\rho+k) \leq n$, as being fixed at their corresponding upper bound value $\hat{b}_{\rho+k}$;
   (e) defining $\hat{x}$ as $\hat{x}_k \cup \hat{x}_{\rho+k}$; and
   (f) defining x as $\hat{x}$ rearranged in the original order of x.

10. The method of claim 9, wherein in sub-step (b), $\rho$ is the first vector index i where projection of $v_i$ onto z is not smaller than $b_i$, according to the order of $\hat{b}$.

11. The method of claim 9, wherein sub-step (b) includes:
   (i) defining a variable memory spaces low and high as $\{low, high\} \leftarrow \{1, n\}$;
   (ii) defining memory space $w \leftarrow (v - b)$ sorted in ascending order;
   (iii) defining $$mid \leftarrow \left\lceil \frac{low + high}{2} \right\rceil;$$

(iv) defining $\bar{z} \leftarrow z - \Sigma_{i:w_i \geq w_{mid}} b_i$;
   (v) defining $\bar{v} \leftarrow \{v_i : w_i < w_{mid}\}$;
   (vi) defining $\bar{b} \leftarrow \{b_i : w_i < w_{mid}\}$;
   (vii) defining a reduce problem as $\bar{x} \leftarrow$ unbounded Euclidean projection of $\bar{v}$ onto $\bar{z}$;
   (viii) IF $(\bar{x}_i < \bar{b}_i \forall i)$, THEN
      $\{low, high\} \leftarrow \{mid, high\}$, ELSE
      $\{low, high\} \leftarrow \{low, mid\}$;
   (ix) IF $(low \geq high)$ then return to return to sub-step (iii);
   (x) assigning $\rho \leftarrow high$.

12. The method of claim 11, wherein in sub-step (vii), the reduced problem of unbounded Euclidean projection of $\bar{v}$ onto $\bar{z}$ is defined as:
   sorting $\bar{v}$ into a memory space $\mu$, where $\mu_1 \geq \mu_2 \geq \ldots \geq \mu_n$;
   finding $$\tau = \max\left(j \in [n] : \mu_j - \frac{1}{j}\left(\sum_{r=1}^{j} \mu_r - \bar{z}\right) > 0\right),$$

where [n] denotes the set of integers 1 to n;
defining $$\theta = \frac{1}{\tau}\left(\sum_{r=1}^{\tau} \mu_r - \bar{z}\right);$$

and
   defining $\bar{x}$ as $\bar{x}_i = \max\{(\bar{v}_i - \theta), 0\}$.

13. The method of claim 1, wherein step (V) includes the following sub-steps:
   (a) defining memory space vvb by merging v and $(v-b)$, wherein vvb is indexed from 0 to $(2n-1)$;

(b) defining an uncertainty interval $[\theta_L, \theta_R]$ of vvb ranging form a left index position of vvb (idx_$\theta_L$) to a right index position of vvb (idx_$\theta_R$), and setting idx_$\theta_L$=0 and idx_$\theta_R$=(2n−1);

(c) defining variable space $S_{all}$ equal to the sum of all $v_i$;

(d) defining index sets $S_L$ and $S_R$ and cardinality variable memory spaces $n_L$ and $n_R$, and initialize $S_L, S_R, n_L$ and $n_R$ to zero;

(e) IF (idx_$\theta_R$)>[(idx_$\theta_L$)+1], then implement sub-steps (f) to (i), ELSE skip to sub-step (j);

(f) defining variable memory space $\theta_{pivot}$, and setting $\theta_{pivot}$ equal to the median of the vector elements within the current uncertainty interval of vvb (i.e. from idx_$\theta_L$ to idx_$\theta_R$);

(g) matching $\theta_{pivot}$ to a vector element within the current uncertainty interval, and storing the index of the matched vector element in memory space idx_$\theta_{pivot}$;

(h) determining $z_{pivot}$ according to the following relation:

$$z_{pivot} = (S_{all} - S_L - S_R) - (n - n_L - n_R)\theta_{pivot} - \left(\sum_{i:\theta_{pivot} \le (v_i - b_i) < \theta_R}(v_i - b_i - \theta_{pivot})\right) - \left(\sum_{i:\theta_L < v_i \le \theta_{pivot}}(v_i - \theta_{pivot})\right);$$

(i) IF $z_{pivot}$>$z_{target}$ then update idx_$\theta_L$, $S_L$ an $n_L$ according to the following relations:

$$\text{idx}\_\theta_L \leftarrow \text{idx}\_\theta_{pivot}$$

$$S_L \leftarrow S_L + \sum_{i:\theta_L < v_i \le \theta_{pivot}} v_i$$

$$n_L \leftarrow n_L + \sum_{i:\theta_L < v_i \le \theta_{pivot}} 1$$

and return to sub-step (e),

ELSE update idx_$\theta_R$, $S_R$ and $n_R$ according to the following relations:

$$\text{idx}\_\theta_R \leftarrow \text{idx}\_\theta_{pivot}$$

$$S_R \leftarrow S_R + \sum_{i:\theta_{pivot} \le v_i - b_i < \theta_R}(v_i - b_i)$$

$$n_R \leftarrow n_R + \sum_{i:\theta_{pivot} \le v_i - b_i < \theta_R} 1$$

and return to sub-step (e);

(j) defining $\theta^*$ as $$\theta^* = \frac{\sum_{i \in U^*} b_i + \sum_{i \in C^*} v_i - z_{target}}{\|C^*\|};$$

and (k) defining projection vector solution x as $$x_i = \begin{cases} 0 & \text{if } v_i \le \theta^* \\ b_i & \text{if } v_i - b_i \ge \theta^* \\ v_i - \theta & \text{if } v_i - b_i < \theta^*. \end{cases}$$

14. The method of claim 13, wherein in sub-step (j), $\theta^*$ is determined according to the following relation:

$$\theta^* \leftarrow \frac{(s_{all} - S_L - S_R - z_{target})}{(n - n_L - n_R)}.$$

15. The method of claim 13, wherein in sub-step (a), the original index i information of vectors v and (v−b) is preserved.

16. The method of claim 1, wherein step (V) includes the following sub-steps:

(a) defining vvb ← merge(v, (v − b));
(b) defining (idx_$\theta_L$, idx_$\theta_R$) ← (0, 2n − 1);
(c) defining $S_{all}$ ← sum(v);
(d) defining ($n_L$, $S_L$) ← 0;
(e) defining ($n_R$, $S_R$) ← 0;
(f) while idx_$\theta_R$ > idx_$\theta_L$ + 1 do
  $\theta_{pivot}$ ← select a pivot point within idx_$\theta_L$ and idx_$\theta_R$,
  partition vvb at $\theta_{pivot}$ between idx_$\theta_L$ and idx_$\theta_R$,
  idx_$\theta_{pivot}$ ← index($\theta_{pivot}$),
  Evaluate $z_{pivot}$ according to $$z_{pivot} = (S_{all} - S_L - S_R) - (n - n_L - n_R)\theta_{pivot} - \left(\sum_{i:\theta_{pivot} \le (v_i - b_i) < \theta_R}(v_i - b_i - \theta_{pivot})\right) - \left(\sum_{i:\theta_L < v_i \le \theta_{pivot}}(v_i - \theta_{pivot})\right),$$

if $z_{pivot}$ > $z_{target}$ then
  idx_$\theta_L$ ← idx_$\theta_{pivot}$,
  update ($n_L$, $S_L$) according to the following relations:

$$S_L \leftarrow S_L + \sum_{i:\theta_L < v_i \le \theta_{pivot}} v_i$$

$$n_L \leftarrow n_L + \sum_{i:\theta_L < v_i \le \theta_{pivot}} 1$$

else
  idx_$\theta_R$ ← idx_$\theta_{pivot}$,
  update ($n_R$, $S_R$) according to the following relations:

$$S_R \leftarrow S_R + \sum_{i:\theta_{pivot} \le v_i - b_i < \theta_R}(v_i - b_i)$$

$$n_R \leftarrow n_R + \sum_{i:\theta_{pivot} \le v_i - b_i < \theta_R} 1$$

end if
end while;
(g) defining $\theta^*$ ← ($S_{all} - S_L - S_R - z_{target}$)/(n − $n_L$ − $n_R$); and
(h) returning x according to the following relations:

$$x_i = \begin{cases} 0 & \text{if } v_i \le \theta^* \\ b_i & \text{if } v_i - b_i \ge \theta^* \\ v_i - \theta & \text{if } v_i - b_i < \theta^*. \end{cases}$$

17. The method claim 16, wherein $\theta_{pivot}$ is selected as the median of vvb within the range defined from idx_$\theta_L$ to idx_$\theta_R$.

18. A computer implemented method for $L_1$ constraint optimization under box constraints, comprising:
   providing a data processing device to implement the following steps:
   (I) accessing a vector v, where v∈$\mathbb{R}^n_+$;
   (II) accessing upper bound constraints b, where b is a vector of upper bound constraints; and
   (III) identifying a projection vector solution, x, as the projection of vector v onto the $L_1$-norm as limited by upper bounds b, wherein projection vector solution x is defined as $$\max_x \frac{1}{2}\|x-v\|_2^2$$

such that $\{x\in\Omega:\|x\|_1\leq z, 0\preccurlyeq x\preccurlyeq b\}$, where elements α of Ω are defined as α∈Ω where $|a|_1\leq z$ and $0\leq a\leq b$, $0\in R^n$ is a vector of all zeros, b∈$\mathbb{R}^n_+$; and notation (p$\preccurlyeq$q) denotes that $p_i\leq q_i$, $\forall i\in\{1,n\}$.

19. The method of claim 18, wherein step (II) further includes redefining b as b←min(b, v).

20. The method of claim 18, wherein step (III) includes the following sub-steps:
   (a) identifying a first intermediate projection vector as the unbounded Euclidean projection of vector v onto the $L_1$-norm;
   (b) IF there is an element of the intermediate projection vector that is larger than its corresponding upper bound as defined in b,
      THEN fixing said element of the intermediate projection vector at its corresponding upper bound as defined b, and
         IF the intermediate projection vector is not on the $L_1$-norm,
         THEN moving the intermediate projection vector to the $L_1$-norm while maintaining constant all elements of the intermediate projection vector already fixed at their corresponding upper bound, and returning to the start of step (b),
         ELSE returning to start of step (b);
   (c) defining the intermediate projection vector as the projection vector solution x.

21. The method of claim 18, wherein step (III) includes the following sub-steps:
   (a) defining a memory space L←{1, 2 ... n};
   (b) defining a memory space U←[ ], where [ ] denotes a null set with no elements;
   (d) defining a memory space $\bar{z}$←(z−$\Sigma_{i:i\in U}b_i$);
   (e) defining a memory space $\bar{v}$←{$v_i$:i∈L};
   (f) defining an intermediate projection vector $\bar{x}$ as the unbounded Euclidean projection of vector $\bar{v}$ onto $\bar{z}$;
   (g) defining a memory space W←{i:$x_i\geq b_1$};
   (h) updating L as L←L−W;
   (i) updating U as U←U∪W;
   (j) updating x[L] as x[L]←$\bar{x}$[L];
   (k) updating x[U] as x[U]←b[U];
   (l) if W==[ ], then return to step (d); and
   (m) return projection vector solution x.

22. The method of claim 18, wherein step (III) includes the following sub-steps:
   (a) sorting quantities ($v_i$−$b_i$)'s in ascending order, and arranging x and b in the same order to define $\hat{x}$ and $\hat{b}$ respectively;
   (b) determining an index ρ where 1≤ρ≤n, ρ is the first index according to the order of $\hat{b}$ where projection of $v_\rho$ onto z is not smaller than $b_\rho$, and all $\hat{x}_{\rho+k}$ are fixed at their respective upper bound $\hat{b}_{\rho+k}$ for a positive value of k;
   (c) defining elements $\hat{x}_k$ where k are vector indices ranging from 0 to ≤ρ, as the solution of unbounded Euclidean projection of $v_k$ onto z;
   (d) defining elements $\hat{x}_{\rho+k}$ where k>0 and (ρ+k)≤n, as being fixed at their corresponding upper bound value $\hat{b}_{\rho+k}$;
   (e) defining $\hat{x}$ as $\hat{x}_k\cup\hat{x}_{\rho+k}$; and
   (f) defining x as $\hat{x}$ rearranged in the original order of x.

23. The method of claim 22, wherein sub-step (b) includes:
   (i) defining a variable memory spaces low and high as {low,high}←{1,n};
   (ii) defining memory space w←(v−b) sorted in ascending order;
   (iii) defining $$mid \leftarrow \left\lceil\frac{low+high}{2}\right\rceil;$$

(iv) defining $\bar{z}$←z−$\Sigma_{i:w_i\geq w_{mid}}b_i$;
   (v) defining $\bar{v}$←{$v_i$:$w_i$<$w_{mid}$};
   (vi) defining $\bar{b}$←{$b_i$:$w_i$<$w_{mid}$};
   (vii) defining a reduce problem as $\bar{x}$←unbounded Euclidean projection of $\bar{v}$ onto $\bar{z}$;
   (viii) IF ($\bar{x}_i$<$\bar{b}_i$,∀i), THEN {low,high}←{mid,high}, ELSE {low,high}←{low,mid};
   (ix) IF (low≥high) then return to return to sub-step (iii);
   (x) assigning p←high.

24. The method of claim 18, wherein step (III) includes the following sub-steps:
   (a) defining memory space vvb by merging v and (v−b), wherein vvb is indexed from 0 to (2n−1);
   (b) defining an uncertainty interval [$\theta_L$, $\theta_R$] of vvb ranging form a left index position of vvb (idx_$\theta_L$) to a right index position of vvb (idx_$\theta_R$), and setting idx_$\theta_L$=0 and idx_$\theta_R$=(2n−1);
   (c) defining variable space $S_{all}$ equal to the sum of all $v_i$;
   (d) defining index sets $S_L$ and $S_R$ and cardinality variable memory spaces $n_L$ and $n_R$, and initialize $S_L$, $S_R$, $n_L$ and $n_R$ to zero;
   (e) IF (idx_$\theta_R$)>[(idx_$\theta_L$)+1], then implement sub-steps (f) to (i), ELSE skip to sub-step (j);
   (f) defining variable memory space $\theta_{pivot}$, and setting $\theta_{pivot}$ equal to the median of the vector elements within the current uncertainty interval of vvb (i.e. from idx_$\theta_L$ to idx_$\theta_R$);
   (g) matching $\theta_{pivot}$ to a vector element within the current uncertainty interval, and storing the index of the matched vector element in memory space idx_$\theta_{pivot}$;
   (h) determining $z_{pivot}$ according to the following relation:

$$z_{pivot} = (S_{all}-S_L-S_R)-(n-n_L-n_R)\theta_{pivot} - \left(\sum_{i:\theta_{pivot}\leq(v_i-b_i)<\theta_R}(v_i-b_i-\theta_{pivot})\right)-\left(\sum_{i:\theta_L<v_i\leq\theta_{pivot}}(v_i-\theta_{pivot})\right);$$

(i) IF $z_{pivot} > z_{target}$ then update $idx\_\theta_L$, $S_L$ and $n_L$ according to the following relations:

$$idx\_\theta_L \leftarrow idx\_\theta_{pivot}$$

$$S_L \leftarrow S_L + \sum_{i:\theta_L < v_i \leq \theta_{pivot}} v_i$$

$$n_L \leftarrow n_L + \sum_{i:\theta_L < v_i \leq \theta_{pivot}} 1$$

and return to sub-step (e),
ELSE update $idx\_\theta_R$, $S_R$ and $n_R$ according to the following relations:

$$idx\_\theta_R \leftarrow idx\_\theta_{pivot}$$

$$S_R \leftarrow S_R + \sum_{i:\theta_{pivot} \leq v_i - b_i < \theta_R} (v_i - b_i)$$

$$n_R \leftarrow n_R + \sum_{i:\theta_{pivot} \leq v_i - b_i < \theta_R} 1$$

and return to sub-step (e);
(j) defining $\theta^*$ as $$\theta^* = \frac{\sum_{i \in U^*} b_i + \sum_{i \in C^*} v_i - z_{target}}{\|C^*\|};$$

and
(k) defining projection vector solution x as $$x_i = \begin{cases} 0 & \text{if } v_i \leq \theta^* \\ b_i & \text{if } v_i - b_i \geq \theta^* \\ v_i - \theta & \text{if } v_i - b_i < \theta^*. \end{cases}$$

25. The method of claim 24, wherein in sub-step (j), $\theta^*$ is determined according to the following relation:

$$\theta^* \leftarrow \frac{(s_{all} - S_L - S_R - z_{target})}{(n - n_L - n_R)}.$$

26. The method of claim 24, wherein in sub-step (a), the original index i information of vectors v and (v−b) is preserved.

27. The method of claim 18, wherein step (III) includes the following sub-steps:

(a) defining vvb ← merge(v, (v − b));
(b) defining $(idx\_\theta_L, idx\_\theta_R) \leftarrow (0, 2n-1)$;
(c) defining $S_{all} \leftarrow$ sum(v);
(d) defining $(n_L, S_L) \leftarrow 0$;
(e) defining $(n_R, S_R) \leftarrow 0$;
(f) while $idx\_\theta_R > idx\_\theta_L + 1$ do
$\theta_{pivot} \leftarrow$ the median of vvb within indices $idx\_\theta_L$ and $idx\_\theta_R$,
partition vvb at $\theta_{pivot}$ between $idx\_\theta_L$ and $idx\_\theta_R$,
$idx\_\theta_{pivot} \leftarrow$ index($\theta_{pivot}$),
Evaluate $z_{pivot}$ according to $$z_{pivot} = (S_{all} - S_L - S_R) - (n - n_L - n_R)\theta_{pivot} - \left(\sum_{i:\theta_{pivot} \leq (v_i - b_i) < \theta_R} (v_i - b_i - \theta_{pivot})\right) - \left(\sum_{i:\theta_L < v_i \leq \theta_{pivot}} (v_i - \theta_{pivot})\right),$$

if $z_{pivot} > z_{target}$ then
$idx\_\theta_L \leftarrow idx\_\theta_{pivot}$,
update $(n_L, S_L)$ according to the following relations:

$$S_L \leftarrow S_L + \sum_{i:\theta_L < v_i \leq \theta_{pivot}} v_i$$

$$n_L \leftarrow n_L + \sum_{i:\theta_L < v_i \leq \theta_{pivot}} 1$$

else
$idx\_\theta_R \leftarrow idx\_\theta_{pivot}$,
update $(n_R, S_R)$ according to the following relations:

$$S_R \leftarrow S_R + \sum_{i:\theta_{pivot} \leq v_i - b_i < \theta_R} (v_i - b_i)$$

$$n_R \leftarrow n_R + \sum_{i:\theta_{pivot} \leq v_i - b_i < \theta_R} 1$$

end if
end while;
(g) defining $\theta^* \leftarrow (S_{all} - S_L - S_R - z_{target})/(n - n_L - n_R)$; and
(h) returning x according to the following relations:

$$x_i = \begin{cases} 0 & \text{if } v_i \leq \theta^* \\ b_i & \text{if } v_i - b_i \geq \theta^* \\ v_i - \theta & \text{if } v_i - b_i < \theta^*. \end{cases}$$

\* \* \* \* \*